(12) United States Patent
Benson et al.

(10) Patent No.: US 12,442,252 B2
(45) Date of Patent: Oct. 14, 2025

(54) SYSTEMS AND METHODS FOR DRILLING GEOTHERMAL WELLS

(71) Applicant: Helmerich & Payne Technologies, LLC, Tulsa, OK (US)

(72) Inventors: Todd W. Benson, Tulsa, OK (US); Angus Lamberton Jamieson, Inverness (GB)

(73) Assignee: Helmerich & Payne Technologies, LLC, Tulsa, OK (US)

( * ) Notice: Subject to any disclaimer, the term of this patent is extended or adjusted under 35 U.S.C. 154(b) by 0 days.

(21) Appl. No.: 18/663,313

(22) Filed: May 14, 2024

(65) Prior Publication Data

US 2024/0301753 A1    Sep. 12, 2024

Related U.S. Application Data

(63) Continuation of application No. 17/823,485, filed on Aug. 30, 2022, now Pat. No. 12,018,564.
(Continued)

(51) Int. Cl.
   *E21B 7/04*   (2006.01)
   *E21B 7/18*   (2006.01)
   (Continued)

(52) U.S. Cl.
   CPC .............. *E21B 7/046* (2013.01); *E21B 7/18* (2013.01); *E21B 29/002* (2013.01); *E21B 44/00* (2013.01); *F03G 4/00* (2021.08)

(58) Field of Classification Search
   CPC .............................. E21B 44/00; E21B 7/046
   See application file for complete search history.

(56) References Cited

U.S. PATENT DOCUMENTS 4,753,485 A * 6/1988 Goodhart ................ E21B 7/061
                                                                         299/5
12,018,564 B2   6/2024 Benson et al.
(Continued)

FOREIGN PATENT DOCUMENTS

CN    102536174 B    9/2015
CN    105840146 A    8/2016
(Continued)

OTHER PUBLICATIONS

"A New Concept for Geothermal Energy Extraction: The Radiator—Enhanced Geothermal System", Available Online at: https://www.youtube.com/watch?v=DDRglOtzHrs, Oct. 1, 2016, pp. 1-4.
(Continued)

*Primary Examiner* — Kristyn A Hall
(74) *Attorney, Agent, or Firm* — Kilpatrick Townsend & Stockton LLP

(57) ABSTRACT

Systems and methods for drilling a geothermal well can include drilling a first borehole to a geothermal target, the first borehole defining a longitudinal axis; and drilling a first portion of a second borehole having a first end and a second. The first end of the second borehole extends from the first borehole, the first portion extends downwardly and outwardly from the longitudinal axis of the first borehole, and the first portion of the second borehole is in fluid communication with the first borehole. The techniques can include drilling a second d portion of the second borehole. The second portion extends downwardly and towards the longitudinal axis of the first borehole, the second end of the second borehole extends to the first borehole, and the second portion of the second borehole is in fluid communication with the first borehole.

20 Claims, 21 Drawing Sheets

Related U.S. Application Data

(60) Provisional application No. 63/240,034, filed on Sep. 2, 2021, provisional application No. 63/260,797, filed on Aug. 31, 2021.

(51) Int. Cl.
  *E21B 29/00* (2006.01)
  *E21B 44/00* (2006.01)
  *F03G 4/00* (2006.01)

(56) References Cited

U.S. PATENT DOCUMENTS

| | | | |
|---|---|---|---|
| 2011/0247816 A1* | 10/2011 | Carter, Jr. | E21B 43/26 166/298 |
| 2012/0174581 A1 | 7/2012 | Vaughan et al. | |
| 2013/0000908 A1 | 1/2013 | Walters et al. | |
| 2016/0245550 A1* | 8/2016 | Sønju | F24T 10/10 |
| 2016/0290118 A1* | 10/2016 | Xue | G05B 15/02 |
| 2018/0283735 A1 | 10/2018 | Song et al. | |
| 2019/0017360 A1 | 1/2019 | Wheeler et al. | |
| 2019/0093641 A1 | 3/2019 | Sumrall | |
| 2020/0080409 A1 | 3/2020 | Haggerty et al. | |

FOREIGN PATENT DOCUMENTS

| | | |
|---|---|---|
| CN | 208059337 U | 11/2018 |
| WO | 2015030601 A1 | 3/2015 |
| WO | 2015187919 A1 | 12/2015 |
| WO | 2019156796 A1 | 8/2019 |

OTHER PUBLICATIONS

U.S. Appl. No. 17/823,485, "Non-Final Office Action", Dec. 18, 2023, 11 pages.
U.S. Appl. No. 17/823,485, "Notice of Allowance", Apr. 16, 2024, 10 pages.
Karimi, et al., "H51L-1651 The Vast Potential of Geothermal Energy in the United States and an Approach to Extract It", Available Online at: https://agu.confex.com/agu/fm19/meetingapp.cgi/Paper/494065, Dec. 13, 2019, pp. 1-4.
Karimi, "Johns Hopkins Geothermal Energy Initiative", Available Online at: https://pages.jh.edu/mkarimi1/Research%20Interests%20/geothermal/geothermal.html, Jun. 2021, 3 pages.
Karimi, et al., "Radiator Enhanced Geothermal System: From Numerical Modeling to Construction", Available Online at: https://ui.adsabs.harvard.edu/abs/2018AGUFM.H33J2227K/abstract, Dec. 2018, 1 page.
Marsh, et al., "A Radiator—EGS System: A Novel Concept for Geothermal Energy Extraction", SMU Geothermal Conference, Available Online at: https://www.smu.edu/-/media/Site/Dedman/Academics/Programs/Geothermal-Lab/Conference/PastPresentations/2015/Marsh_SMU_GeoConference_2015.pdf?la=en, May 18-20, 2015, 31 pages.
PCT/US2022/075786, "International Preliminary Report on Patentability", Mar. 14, 2024, 13 pages.
PCT/US2022/075786, "International Search Report and Written Opinion", Jan. 24, 2023, 18 pages.
PCT/US2022/075786, "Invitation to Pay Additional Fees and, Where Applicable, Protest Fee", Nov. 24, 2022, 4 pages.
EP 22783226.8, "Office Action", Feb. 27, 2025, 3 pages.
EP22783226.8, "Office Action", May 2, 2025, 10 pages.

* cited by examiner

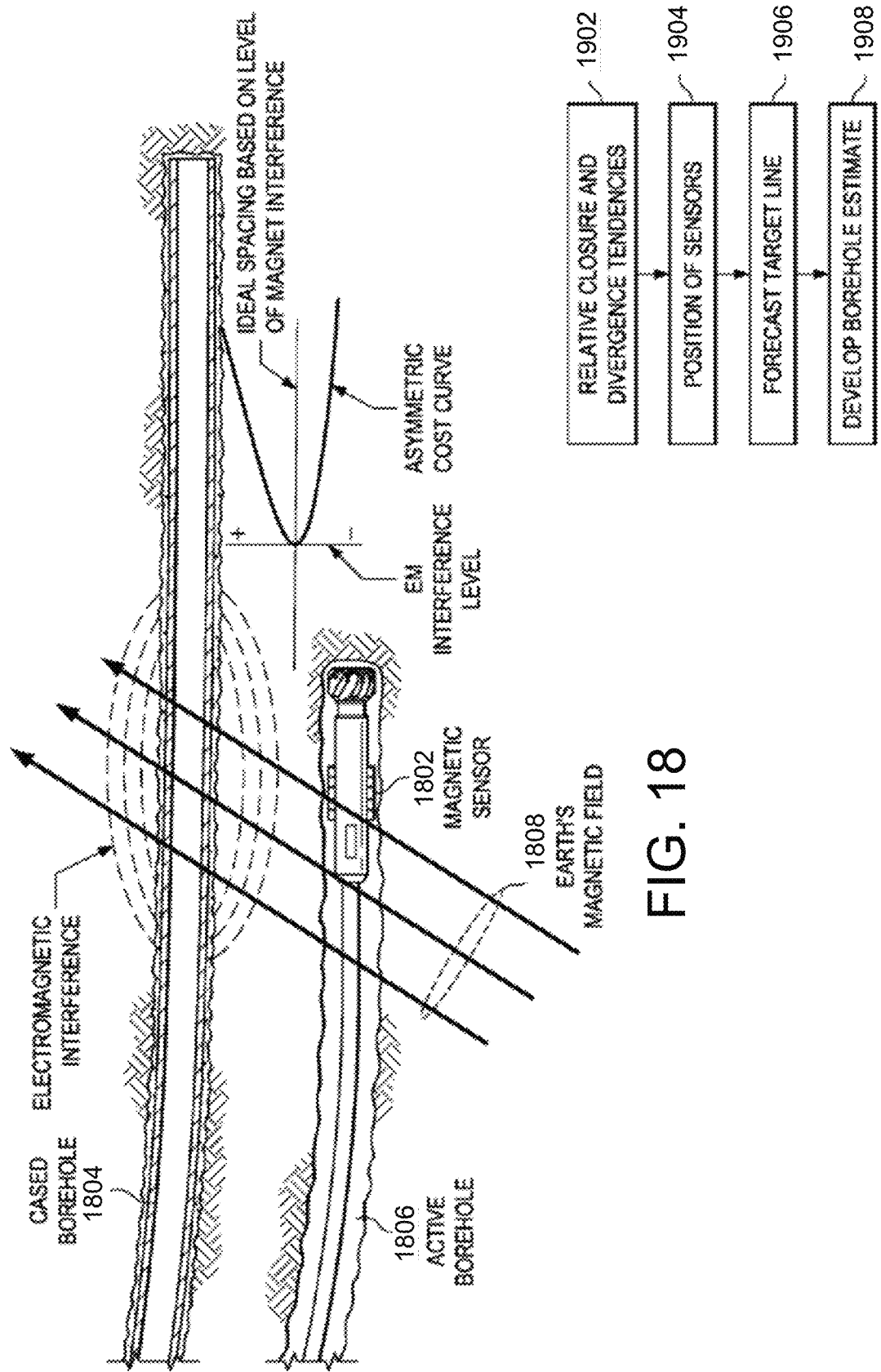

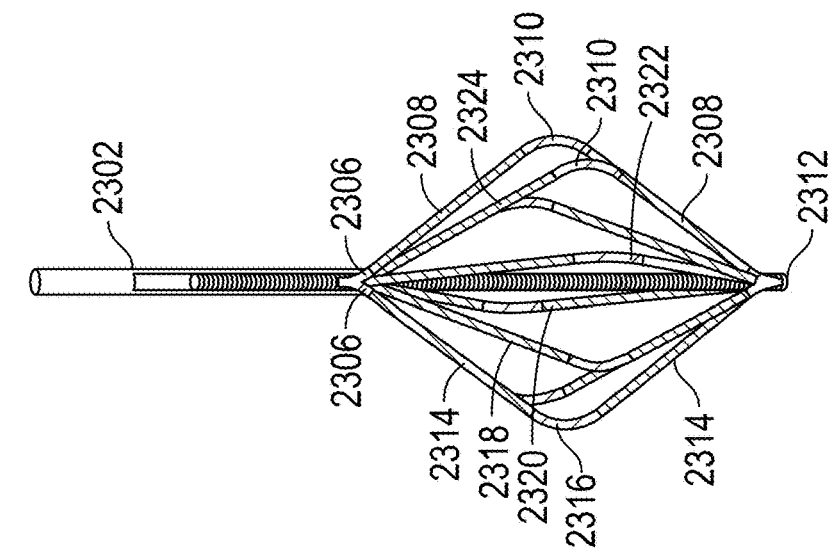
FIG. 23D
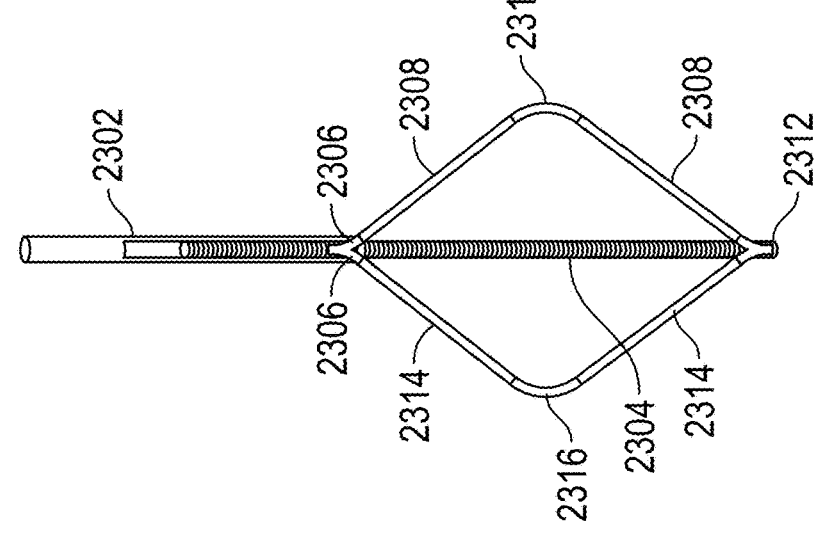
FIG. 23C
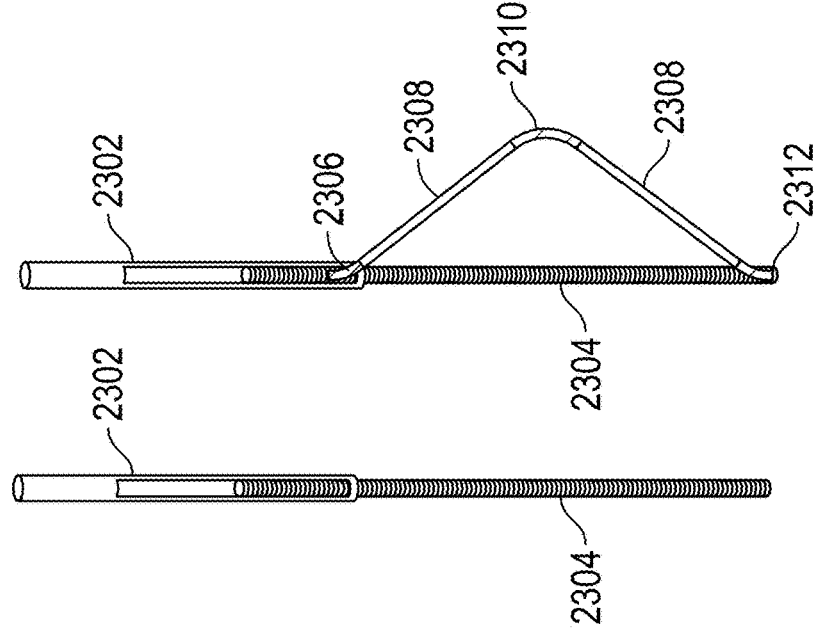
FIG. 23B
FIG. 23A

SYSTEMS AND METHODS FOR DRILLING GEOTHERMAL WELLS

CROSS-REFERENCES TO RELATED APPLICATIONS

This application is a continuation of U.S. patent application Ser. No. 17/823,485, filed Aug. 30, 2022, published on Mar. 2, 2023, as U.S. Publication No. 2023/0069702, entitled SYSTEMS AND METHODS FOR DRILLING GEOTHERMAL WELLS, which claims priority to and the benefit of U.S. Provisional Patent Application No. 63/260,797, filed Aug. 31, 2021, and U.S. Provisional Patent No. 63/240,034, filed Sep. 2, 2021, both entitled SYSTEMS AND METHODS FOR DRILLING GEOTHERMAL WELLS. All three of the foregoing applications are hereby incorporated by reference in their entirety as if fully set forth herein and for all purposes.

BACKGROUND

Field of the Disclosure

The present disclosure relates generally to drilling of wells for oil and gas production and, more particularly, to systems and methods for drilling geothermal wells.

Description of the Related Art

Geothermal power generation can provide several advantages. Geothermal energy can be more environmentally friendly than conventional fuel sources. Geothermal energy can be a source of renewable energy. The number of exploitable geothermal resources will increase with ongoing research and development in the industry. Geothermal energy is a sustainable source of energy that can be consistently available unlike some other renewable energy sources (e.g., wind and solar power). Geothermal energy can be a reliable source of energy and it can be easier to predict the power output from a geothermal plant with a high degree of accuracy. No additional fuel may be required for geothermal energy. New technologies are being created to improve the energy process as a result of increase in exploration. Geothermal energy production can result in much lower pollution levels as compared to fossil fuels.

A major disadvantage of geothermal energy is that it is location specific. For example, geothermal energy is economic in places like Iceland, Alaska, and East Asia generally because these locations have access to a shallow heat source. Additional disadvantages can include the release of gasses into the atmosphere during drilling. Some geothermal wells can present a risk of triggering earthquakes. Currently, geothermal energy can be expensive to exploit with high upfront costs ranging from around $2 million to $7 million for a plant with a 1-megawatt capacity. Another disadvantage can include that fluid may be required to be pumped back into the underground reservoirs faster than it is depleted. Management can be required to maintain sustainability.

In order to offset various disadvantages and improve the efficiency of geothermal wells several techniques and devices have been developed. These techniques can determine the most cost-effective way of exposing maximum circulation to maximum heat. These techniques can adapt existing oil and gas technologies for maximum benefit of geothermal energy systems. These techniques can reduce drilling time to a minimum while simultaneously maximizing heat production over time.

Some current implementations of a geothermal well require the drilling of two or more wells. For example, two vertical wells may be drilled, with one of the vertical wells used for injection and the other vertical well used for recovery of the hot water or steam. However, the cost of drilling two vertical wells for use for geothermal power generation can be cost prohibitive. Therefore, techniques that minimize the drilling required while maximizing the heat transfer would be more economically feasible.

BRIEF SUMMARY

Certain embodiments of the present disclosure can provide methods, systems, and apparatuses for drilling geothermal wells and using such wells to generate electricity.

In an aspect, techniques for drilling a geothermal well comprise drilling a first borehole to a geothermal target, the first borehole defining a longitudinal axis. The techniques can further comprise drilling a first portion of a second borehole having a first end and a second end. The first end of the second borehole extends from the first borehole, the first portion extends downwardly and outwardly from the longitudinal axis of the first borehole, and the first portion of the second borehole is in fluid communication with the first borehole. The techniques can comprise drilling a second portion of the second borehole. The second portion extends downwardly and towards the longitudinal axis of the first borehole, the second end of the second borehole extends to the first borehole, and the second portion of the second borehole is in fluid communication with the first borehole.

In various embodiments, the techniques can comprise drilling a plurality of boreholes, each having a first end and a second end and a first portion and a second portion. Each of the first ends of the plurality of boreholes are connected to the first borehole at a first point, and each of the second ends of the plurality of boreholes are connected to the first borehole at a second point. Each first point is higher than each corresponding second point for each of the plurality of boreholes.

In various embodiments, the plurality of boreholes comprise at least three boreholes.

In various embodiments, the plurality of boreholes comprises at least six boreholes.

In various embodiments, the plurality of boreholes are positioned around the longitudinal axis of the first borehole and radially spaced apart from one another by at least thirty degrees.

In various embodiments, the first portion of the second borehole extends downwardly away from the first borehole at an angle of at least thirty degrees.

In various embodiments, the second portion of the second borehole extends downwardly towards the first borehole at an angle of at least thirty degrees.

In various embodiments, the first portion of the second borehole is drilled to a first location a predetermined distance from a true vertical depth of the geothermal target. The predetermined distance is less than half-way to the true vertical depth of the geothermal target. The first borehole has a first diameter, and the second borehole has a second diameter smaller than the first diameter.

In an aspect, a controller device, includes a memory comprising computer-executable instructions and one or more processors in communication with the memory and configured to access the memory and execute the computer-executable instructions to perform the method of any of the techniques described above.

In an aspect, one or more non-transitory computer-readable storage medium comprising computer-executable instructions that, when executed by one or more processors, cause the one or more processors to perform the method of any of the techniques described above.

Reference to the remaining portions of the specification, including the drawings and claims, will realize other features and advantages of embodiments of the present disclosure. Further features and advantages, as well as the structure and operation of various embodiments of the present disclosure, are described in detail below with respect to the accompanying drawings. In the drawings, like reference numbers can indicate identical or functionally similar elements.

BRIEF DESCRIPTION OF THE DRAWINGS

For a more complete understanding of the present invention and its features and advantages, reference is now made to the following description, taken in conjunction with the accompanying drawings, in which:

FIG. 11A illustrates a vertical borehole with multiple lateral boreholes, according to various embodiments;

FIG. 11B illustrates chambering out a plurality of chamber points in one of the lateral boreholes, according to various embodiments;

FIG. 11C illustrates a plurality of passageways that can drilled between the plurality of lateral boreholes, according to various embodiments;

FIG. 12A illustrates a vertical borehole with multiple lateral boreholes, according to various embodiments;

FIG. 12B illustrates chambering out a plurality of chamber points in one of the lateral boreholes, according to various embodiments;

FIG. 12C illustrates a plurality of vertical passageways that can drilled between the plurality of lateral boreholes, according to various embodiments;

FIG. 18 illustrates the use of an iterative planning function for determining a well plan for wells in a common area, according to various embodiments;

FIG. 19 is a flow diagram of a process for forecasting a future ideal spacing path, according to various embodiments;

FIGS. 23A-23D illustrates various stage of an exemplary geothermal well, according to various embodiments;

FIG. 23A illustrates a first stage in an exemplary geothermal well, according to various embodiments;

FIG. 23B illustrates a second stage of an exemplary geothermal well, according to various embodiments;

FIG. 23C illustrates a third stage of an exemplary geothermal well, according to various embodiments;

FIG. 23D illustrates a fourth stage of an exemplary geothermal well, according to various embodiments;

FIG. 25A illustrates a vertical borehole with multiple lateral boreholes, according to various embodiments;

FIG. 25B illustrates chambering out a plurality of chamber points in one of the lateral boreholes, according to various embodiments; and FIG. 25C illustrates a plurality of vertical passageways that can drilled between the plurality of lateral boreholes, according to various embodiments.

DESCRIPTION OF PARTICULAR EMBODIMENT(S)

Figure 1:
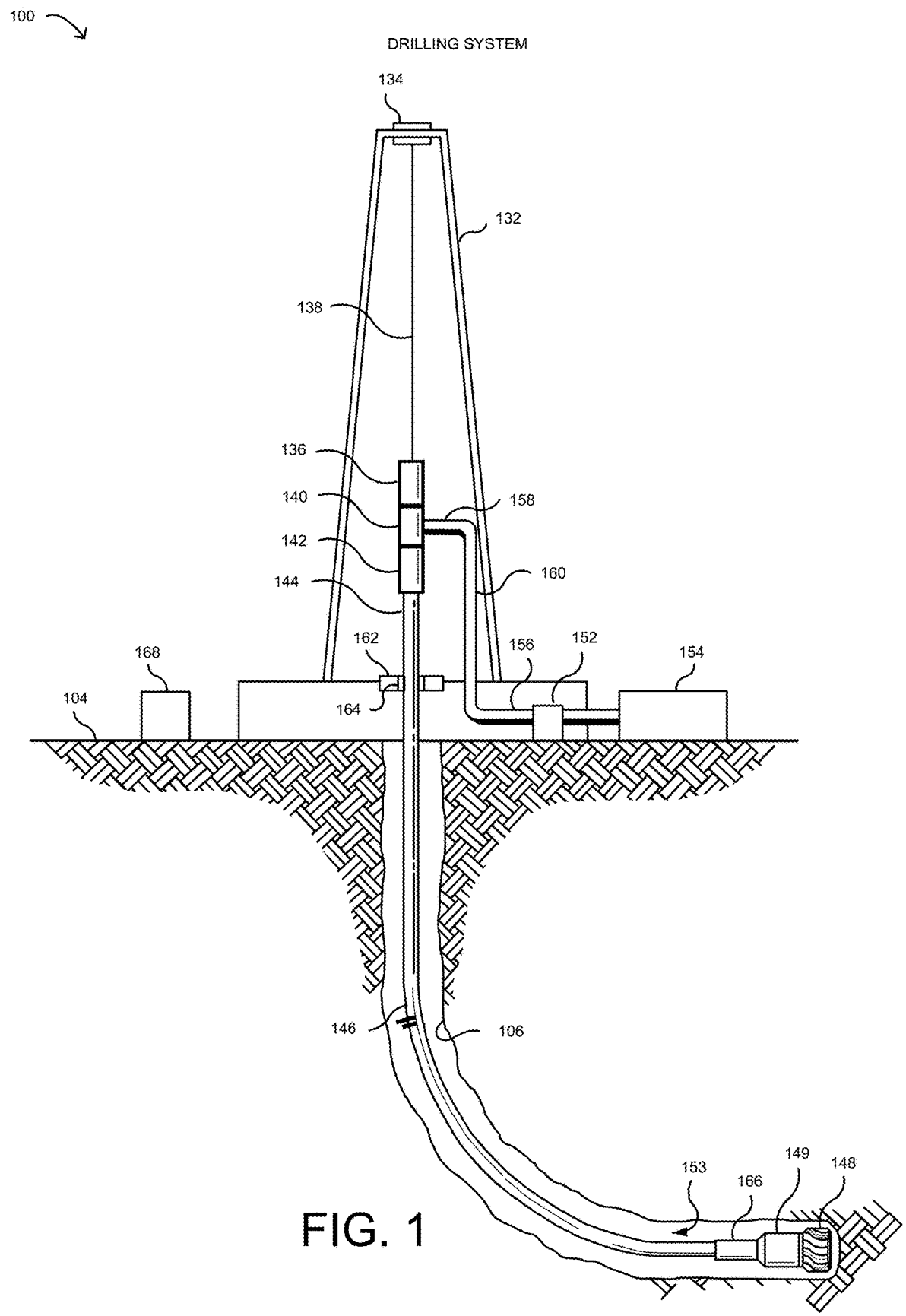
FIG. 1 is a depiction of a drilling system for drilling a borehole, according to various embodiments.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), device "12-1" refers to an instance of a device class, which may be referred to collectively as devices "12" and any one of which may be referred to generically as a device "12". In the figures and the description, like numerals are intended to represent like elements.

Drilling a well typically involves a substantial amount of human decision-making during the drilling process. For example, geologists and drilling engineers use their knowledge, experience, and the available information to make decisions on how to plan the drilling operation, how to accomplish the drill plan, and how to handle issues that arise during drilling. However, even the best geologists and drilling engineers perform some guesswork due to the unique nature of each borehole (e.g., wellbore). Furthermore, a directional human driller performing the drilling may have drilled other boreholes in the same region and so may have some similar experience. However, during drilling operations, a multitude of input information and other factors may affect a drilling decision being made by a human operator or specialist, such that the amount of information may overwhelm the cognitive ability of the human to properly consider and factor into the drilling decision. Furthermore, the quality or the error involved with the drilling decision may improve with larger amounts of input data being considered, for example, such as formation data from a large number of offset wells. For these reasons, human specialists may be unable to achieve optimal drilling decisions, particularly when such drilling decisions are made under time constraints, such as during drilling operations when continuation of drilling is dependent on the drilling decision and, thus, the entire drilling rig waits idly for the next drilling decision. Furthermore, human decision-making for drilling decisions can result in expensive mistakes because drilling errors can add significant cost to drilling operations. In some cases, drilling errors may permanently lower the output of a well, resulting in substantial long term economic losses due to the lost output of the well.

The systems and methods used to drill oil and gas wells are complex and sophisticated. Methods and systems developed for oil and gas wells can be adapted for use in planning, drilling, and creating wells for geothermal energy. The following discussion provides a description of systems and techniques for drilling wells that can be useful for drilling geothermal wells, as well as generating electricity therefrom.

Referring now to the drawings, Referring to FIG. 1, a drilling system 100 is illustrated in one embodiment as a top drive system. As shown, the drilling system 100 includes a derrick 132 on the surface 104 of the earth and is used to drill a borehole 106 into the earth. Typically, drilling system 100 is used at a location corresponding to a geographic formation 102 in the earth that is known.

In FIG. 1, derrick 132 includes a crown block 134 to which a traveling block 136 is coupled via a drilling line 138. In drilling system 100, a top drive 140 is coupled to traveling block 136 and may provide rotational force for drilling. A saver sub 142 may sit between the top drive 140 and a drill pipe 144 that is part of a drill string 146. Top drive 140 may rotate drill string 146 via the saver sub 142, which in turn may rotate a drill bit 148 of a bottom hole assembly (BHA) 149 in borehole 106 passing through formation 102. Also visible in drilling system 100 is a rotary table 162 that may be fitted with a master bushing 164 to hold drill string 146 when not rotating.

A mud pump 152 may direct a fluid mixture (e.g., drilling mud 153) from a mud pit 154 into drill string 146. Mud pit 154 is shown schematically as a container, but it is noted that various receptacles, tanks, pits, or other containers may be used. Drilling mud 153 may flow from mud pump 152 into a discharge line 156 that is coupled to a rotary hose 158 by a standpipe 160. Rotary hose 158 may then be coupled to top drive 140, which includes a passage for drilling mud 153 to flow into borehole 106 via drill string 146 from where drilling mud 153 may emerge at drill bit 148. Drilling mud 153 may lubricate drill bit 148 during drilling and, due to the pressure supplied by mud pump 152, drilling mud 153 may return via borehole 106 to surface 104.

In drilling system 100, drilling equipment (see also FIG. 5) is used to perform the drilling of borehole 106, such as top drive 140 (or rotary drive equipment) that couples to drill string 146 and BHA 149 and is configured to rotate drill string 146 and apply pressure to drill bit 148. Drilling system 100 may include control systems such as a WOB/differential pressure control system 522, a positional/rotary control system 524, a fluid circulation control system 526, and a sensor system 528, as further described below with respect to FIG. 5. The control systems may be used to monitor and change drilling rig settings, such as the WOB or differential pressure to alter the ROP or the radial orientation of the toolface, change the flow rate of drilling mud 153, and perform other operations. Sensor system 528 may be for obtaining sensor data about the drilling operation and drilling system 100, including the downhole equipment. For example, sensor system 528 may include MWD or logging while drilling (LWD) tools for acquiring information, such as toolface and formation logging information, which may be saved for later retrieval, transmitted with or without a delay using any of various communication means (e.g., wireless, wireline, or mud pulse telemetry), or otherwise transferred to steering control system 168. As used herein, an MWD tool is enabled to communicate downhole measurements without substantial delay to the surface 104, such as using mud pulse telemetry, while a LWD tool is equipped with an internal memory that stores measurements when downhole and can be used to download a stored log of measurements when the LWD tool is at the surface 104. The internal memory in the LWD tool may be a removable memory, such as a universal serial bus (USB) memory device or another removable memory device. It is noted that certain downhole tools may have both MWD and LWD capabilities. Such information acquired by sensor system 528 may include information related to hole depth, bit depth, inclination angle, azimuth angle, true vertical depth, gamma count, standpipe pressure, mud flow rate, rotary rotations per minute (RPM), bit speed, ROP, WOB, among other information. It is noted that all or part of sensor system 528 may be incorporated into a control system, or in another component of the drilling equipment. As drilling system 100 can be configured in many different implementations, it is noted that different control systems and subsystems may be used.

Sensing, detection, measurement, evaluation, storage, alarm, and other functionality may be incorporated into a downhole tool 166 or BHA 149 or elsewhere along drill string 146 to provide downhole surveys of borehole 106. Accordingly, downhole tool 166 may be an MWD tool or a LWD tool or both, and may accordingly utilize connectivity to the surface 104, local storage, or both. In different implementations, gamma radiation sensors, magnetometers, accelerometers, and other types of sensors may be used for the downhole surveys. Although downhole tool 166 is shown in singular in drilling system 100, it is noted that multiple instances (not shown) of downhole tool 166 may be located at one or more locations along drill string 146.

In some embodiments, formation detection and evaluation functionality may be provided via a steering control system 168 on the surface 104. Steering control system 168 may be located in proximity to derrick 132 or may be included with drilling system 100. In other embodiments, steering control system 168 may be remote from the actual location of borehole 106 (see also FIG. 4). For example, steering control system 168 may be a stand-alone system or may be incorporated into other systems included with drilling system 100.

In operation, steering control system 168 may be accessible via a communication network (see also FIG. 10) and may accordingly receive formation information via the communication network. In some embodiments, steering control system 168 may use the evaluation functionality to provide corrective measures, such as a convergence plan to overcome an error in the well trajectory of borehole 106 with respect to a reference, or a planned well trajectory. The convergence plans or other corrective measures may depend on a determination of the well trajectory, and therefore, may be improved in accuracy using certain methods and systems for improved drilling performance.

In particular embodiments, at least a portion of steering control system 168 may be located in downhole tool 166 (not shown). In some embodiments, steering control system 168 may communicate with a separate controller (not shown) located in downhole tool 166. In particular, steering control system 168 may receive and process measurements received from downhole surveys and may perform the calculations described herein using the downhole surveys and other information referenced herein.

In drilling system 100, to aid in the drilling process, data is collected from borehole 106, such as from sensors in BHA 149, downhole tool 166, or both. The collected data may include the geological characteristics of formation 102 in which borehole 106 was formed, the attributes of drilling system 100, including BHA 149, and drilling information such as weight-on-bit (WOB), drilling speed, and other information pertinent to the formation of borehole 106. The drilling information may be associated with a particular depth or another identifiable marker to index collected data. For example, the collected data for borehole 106 may capture drilling information indicating that drilling of the well from 1,000 feet to 1,200 feet occurred at a first rate of penetration (ROP) through a first rock layer with a first WOB, while drilling from 1,200 feet to 1,500 feet occurred at a second ROP through a second rock layer with a second WOB (see also FIG. 2). In some applications, the collected data may be used to virtually recreate the drilling process that created borehole 106 in formation 102, such as by displaying a computer simulation of the drilling process. The accuracy with which the drilling process can be recreated depends on a level of detail and accuracy of the collected data, including collected data from a downhole survey of the well trajectory.

The collected data may be stored in a database that is accessible via a communication network for example. In some embodiments, the database storing the collected data for borehole 106 may be located locally at drilling system 100, at a drilling hub that supports a plurality of drilling systems 100 in a region, or at a database server accessible over the communication network that provides access to the database (see also FIG. 4). At drilling system 100, the collected data may be stored at the surface 104 or downhole in drill string 146, such as in a memory device included with BHA 149 (see also FIG. 10). Alternatively, at least a portion of the collected data may be stored on a removable storage medium, such as using steering control system 168 or BHA 149, which is later coupled to the database in order to transfer the collected data to the database, which may be manually performed at certain intervals, for example.

In FIG. 1, steering control system 168 is located at or near the surface 104 where borehole 106 is being drilled. Steering control system 168 may be coupled to equipment used in drilling system 100 and may also be coupled to the database, whether the database is physically located locally, regionally, or centrally (see also FIGS. 4 and 5). Accordingly, steering control system 168 may collect and record various inputs, such as measurement data from a magnetometer and an accelerometer that may also be included with BHA 149.

Steering control system 168 may further be used as a surface steerable system, along with the database, as described above. The surface steerable system may enable an operator to plan and control drilling operations while drilling is being performed. The surface steerable system may itself also be used to perform certain drilling operations, such as controlling certain control systems that, in turn, control the actual equipment in drilling system 100 (see also FIG. 5). The control of drilling equipment and drilling operations by steering control system 168 may be manual, manual-assisted, semi-automatic, or automatic, in different embodiments.

Manual control may involve direct control of the drilling rig equipment, albeit with certain safety limits to prevent unsafe or undesired actions or collisions of different equipment. To enable manual-assisted control, steering control system 168 may present various information, such as using a graphical user interface (GUI) displayed on a display device (see FIG. 8), to a human operator, and may provide controls that enable the human operator to perform a control operation. The information presented to the user may include live measurements and feedback from the drilling rig and steering control system 168, or the drilling rig itself, and may further include limits and safety-related elements to prevent unwanted actions or equipment states, in response to a manual control command entered by the user using the GUI.

To implement semi-automatic control, steering control system 168 may itself propose or indicate to the user, such as via the GUI, that a certain control operation, or a sequence of control operations, should be performed at a given time. Then, steering control system 168 may enable the user to imitate the indicated control operation or sequence of control operations, such that once manually started, the indicated control operation or sequence of control operations is automatically completed. The limits and safety features mentioned above for manual control would still apply for semi-automatic control. It is noted that steering control system 168 may execute semi-automatic control using a secondary processor, such as an embedded controller that executes under a real-time operating system (RTOS), that is under the control and command of steering control system 168. To implement automatic control, the step of manual starting the indicated control operation or sequence of operations is eliminated, and steering control system 168 may proceed with only a passive notification to the user of the actions taken.

In order to implement various control operations, steering control system 168 may perform (or may cause to be performed) various input operations, processing operations, and output operations. The input operations performed by steering control system 168 may result in measurements or other input information being made available for use in any subsequent operations, such as processing or output operations. The input operations may accordingly provide the input information, including feedback from the drilling process itself, to steering control system 168. The processing operations performed by steering control system 168 may be any processing operation, as disclosed herein. The output operations performed by steering control system 168 may involve generating output information for use by external entities, or for output to a user, such as in the form of updated elements in the GUI, for example. The output information may include at least some of the input information, enabling steering control system 168 to distribute information among various entities and processors.

In particular, the operations performed by steering control system 168 may include operations such as receiving drilling data representing a drill path, receiving other drilling parameters, calculating a drilling solution for the drill path based on the received data and other available data (e.g., rig characteristics), implementing the drilling solution at the drilling rig, monitoring the drilling process to gauge whether the drilling process is within a defined margin of error of the drill path, and calculating corrections for the drilling process if the drilling process is outside of the margin of error.

Accordingly, steering control system 168 may receive input information either before drilling, during drilling, or after drilling of borehole 106. The input information may comprise measurements from one or more sensors, as well as survey information collected while drilling borehole 106. The input information may also include a drill plan, a regional formation history, drilling engineer parameters, downhole toolface/inclination information, downhole tool gamma/resistivity information, economic parameters, and reliability parameters, among various other parameters. Some of the input information, such as the regional formation history, may be available from a drilling hub 410, which may have respective access to a regional drilling database (DB) 412 (see FIG. 4). Other input information may be accessed or uploaded from other sources to steering control system 168. For example, a web interface may be used to interact directly with steering control system 168 to upload the drill plan or drilling parameters.

As noted, the input information may be provided to steering control system 168. After processing by steering control system 168, steering control system 168 may generate control information that may be output to drilling rig 210 (e.g., to rig controls 520 that control drilling equipment 530, see also FIGS. 2 and 5). Drilling rig 210 may provide feedback information using rig controls 520 to steering control system 168. The feedback information may then serve as input information to steering control system 168, thereby enabling steering control system 168 to perform feedback loop control and validation. Accordingly, steering control system 168 may be configured to modify its output information to the drilling rig 210, in order to achieve the desired results, which are indicated in the feedback information. The output information generated by steering control system 168 may include indications to modify one or more drilling parameters, the direction of drilling, and the drilling mode, among others. In certain operational modes, such as semi-automatic or automatic, steering control system 168 may generate output information indicative of instructions to rig controls 520 to enable automatic drilling using the latest location of BHA 149. Therefore, an improved accuracy in the determination of the location of BHA 149 may be provided using steering control system 168.

Figure 2:
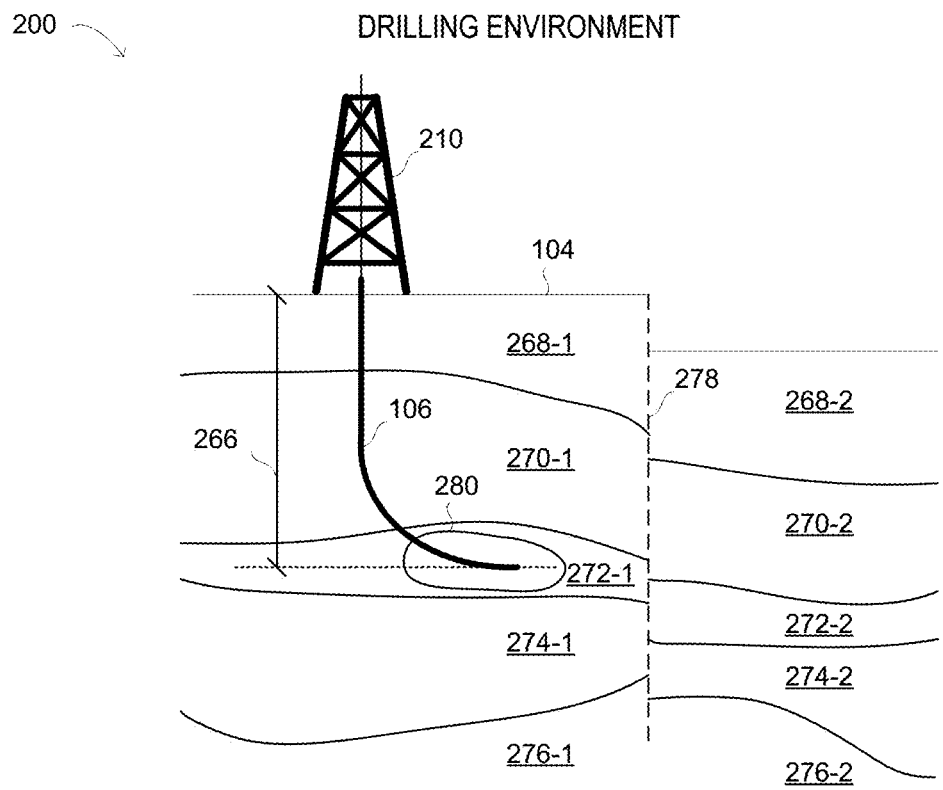
FIG. 2 is a depiction of a drilling environment including the drilling system for drilling a borehole, according to various embodiments.

Referring now to FIG. 2, a drilling environment 200 is depicted schematically and is not drawn to scale or perspective. In particular, drilling environment 200 may illustrate additional details with respect to formation 102 below the surface 104 in drilling system 100 shown in FIG. 1. In FIG. 2, drilling rig 210 may represent various equipment discussed above with respect to drilling system 100 in FIG. 1 that is located at the surface 104.

In drilling environment 200, it may be assumed that a drill plan (also referred to as a well plan) has been formulated to drill borehole 106 extending into the ground to a true vertical depth (TVD) 266 and penetrating several subterranean strata layers. Borehole 106 is shown in FIG. 2 extending through strata layers 268-1 and 270-1, while terminating in strata layer 272-1. Accordingly, as shown, borehole 106 does not extend or reach underlying strata layers 274-1 and 276-1. A target area 280 specified in the drill plan may be located in strata layer 272-1 as shown in FIG. 2. Target area 280 may represent a desired endpoint of borehole 106, such as a hydrocarbon producing area indicated by strata layer 272-1. It is noted that target area 280 may be of any shape and size and may be defined using various different methods and information in different embodiments. In some instances, target area 280 may be specified in the drill plan using subsurface coordinates, or references to certain markers, which indicate where borehole 106 is to be terminated. In other instances, target area may be specified in the drill plan using a depth range within which borehole 106 is to remain. For example, the depth range may correspond to strata layer 272-1. In other examples, target area 280 may extend as far as can be realistically drilled. For example, when borehole 106 is specified to have a horizontal section with a goal to extend into strata layer 172 as far as possible, target area 280 may be defined as strata layer 272-1 itself and drilling may continue until some other physical limit is reached, such as a property boundary or a physical limitation to the length of the drill string 146.

Also visible in FIG. 2 is a fault line 278 that has resulted in a subterranean discontinuity in the fault structure. Specifically, strata layers 268, 270, 272, 274, and 276 have portions on either side of fault line 278. On one side of fault line 278, where borehole 106 is located, strata layers 268-1, 270-1, 272-1, 274-1, and 276-1 are unshifted by fault line 278. On the other side of fault line 278, strata layers 268-2, 270-3, 272-3, 274-3, and 276-3 are shifted downwards by fault line 278.

Current drilling operations frequently include directional drilling to reach a target, such as target area 280. The use of directional drilling has been found to generally increase an overall amount of production volume per well, but also may lead to significantly higher production rates per well, which are both economically desirable. As shown in FIG. 2, directional drilling may be used to drill the horizontal portion of borehole 106, which increases an exposed length of borehole 106 within strata layer 272-1, and which may accordingly be beneficial for hydrocarbon extraction from strata layer 272-1. Directional drilling may also be used alter an angle of borehole 106 to accommodate subterranean faults, such as indicated by fault line 278 in FIG. 2. Other benefits that may be achieved using directional drilling include sidetracking off of an existing well to reach a different target area or a missed target area, drilling around abandoned drilling equipment, drilling into otherwise inaccessible or difficult to reach locations (e.g., under populated areas or bodies of water), providing a relief well for an existing well, and increasing the capacity of a well by branching off and having multiple boreholes extending in different directions or at different vertical positions for the same well. Directional drilling is often not limited to a straight horizontal borehole 106 but may involve staying within a strata layer that varies in depth and thickness as illustrated by strata layer 172. As such, directional drilling may involve multiple vertical adjustments that complicate the trajectory of borehole 106.

Figure 3:
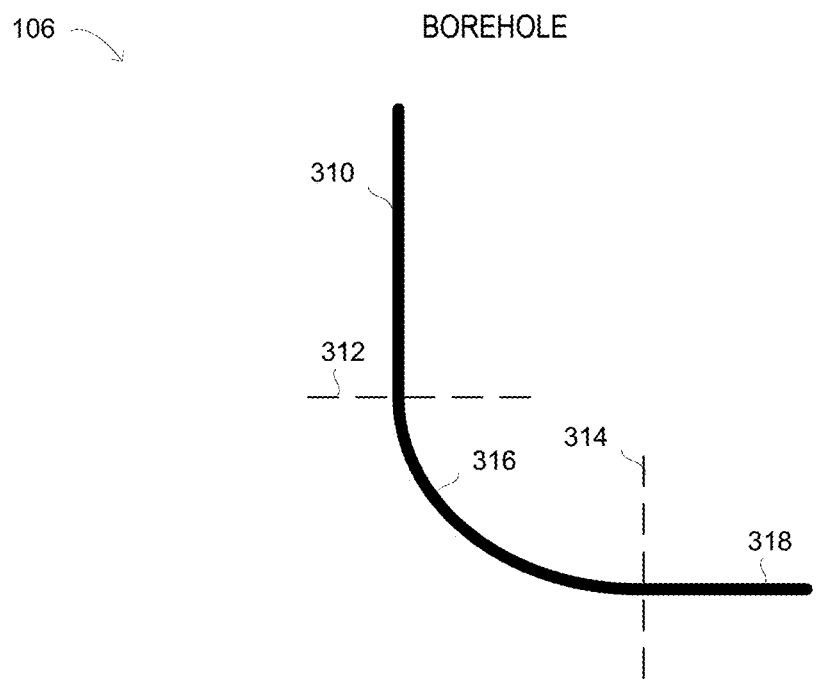
FIG. 3 is a depiction of a borehole generated in the drilling environment, according to various embodiments.

Referring now to FIG. 3, one embodiment of a portion of borehole 106 is shown in further detail. Using directional drilling for horizontal drilling may introduce certain challenges or difficulties that may not be observed during vertical drilling of borehole 106. For example, a horizontal portion 318 of borehole 106 may be started from a vertical portion 310. In order to make the transition from vertical to horizontal, a curve may be defined that specifies a so-called "build up" section 316. Build up section 316 may begin at a kickoff point 312 in vertical portion 310 and may end at a beginning point 314 of horizontal portion 318. The change in inclination in build up section 316 per measured length drilled is referred to herein as a "build rate" and may be defined in degrees per one hundred feet drilled. For example, the build rate may have a value of 6°/100 ft., indicating that there is a six degree change in inclination for everyone hundred feet drilled. The build rate for a particular build up section 316 may remain relatively constant or may vary.

The build rate used for any given build up section 316 may depend on various factors, such as properties of the formation 102 (i.e., strata layers) through which borehole 106 is to be drilled, the trajectory of borehole 106, the particular pipe and drill collars/BHA components used (e.g., length, diameter, flexibility, strength, mud motor bend setting, and drill bit 148), the mud type and flow rate, the specified horizontal displacement, stabilization, and inclination, among other factors. An overly aggressive built rate can cause problems such as severe doglegs (e.g., sharp changes in direction in the borehole) that may make it difficult or impossible to run casing or perform other operations in borehole 106. Depending on the severity of any mistakes made during directional drilling, borehole 106 may be enlarged or drill bit 148 may be backed out of a portion of borehole 106 and redrilled along a different path. Such mistakes may be undesirable due to the additional time and expense involved. However, if the built rate is too cautious, additional overall time may be added to the drilling process because directional drilling generally involves a lower ROP than straight drilling. Furthermore, directional drilling for a curve is more complicated than vertical drilling and the possibility of drilling errors increases with directional drilling (e.g., overshoot and undershoot that may occur while trying to keep drill bit 148 on the planned trajectory).

Two modes of drilling, referred to herein as "rotating" and "sliding," are commonly used to form a borehole 106. Rotating, also called "rotary drilling," uses top drive 140 or rotary table 162 to rotate drill string 146. Rotating may be used when drilling occurs along a straight trajectory, such as for vertical portion 310 of borehole 106. Sliding, also called "steering" or "directional drilling" as noted above, typically uses a mud motor located downhole at BHA 149. The mud motor may have an adjustable bent housing and is not powered by rotation of the drill string 146. Instead, the mud motor uses hydraulic power derived from the pressurized drilling mud 153 that circulates along borehole 106 to and from the surface 104 to directionally drill borehole 106 in build up section 316.

Thus, sliding is used in order to control the direction of the well trajectory during directional drilling. A method to perform a slide may include the following operations. First, during vertical or straight drilling, the rotation of drill string 146 is stopped. Based on feedback from measuring equipment, such as from downhole tool 166, adjustments may be made to drill string 146, such as using top drive 140 to apply various combinations of torque, WOB, and vibration, among other adjustments. The adjustments may continue until a toolface is confirmed that indicates a direction of the bend of the mud motor is oriented to a direction of a desired deviation (i.e., build rate) of borehole 106. Once the desired orientation of the mud motor is attained, WOB to the drill bit 148 is increased, which causes the drill bit 148 to move in the desired direction of deviation. Once sufficient distance and angle have been built up in the curved trajectory, a transition back to rotating mode can be accomplished by rotating the drill string 146 again. The rotation of the drill string 146 after sliding may neutralize the directional deviation caused by the bend in the mud motor due to the continuous rotation around a centerline of borehole 106.

Figure 4:
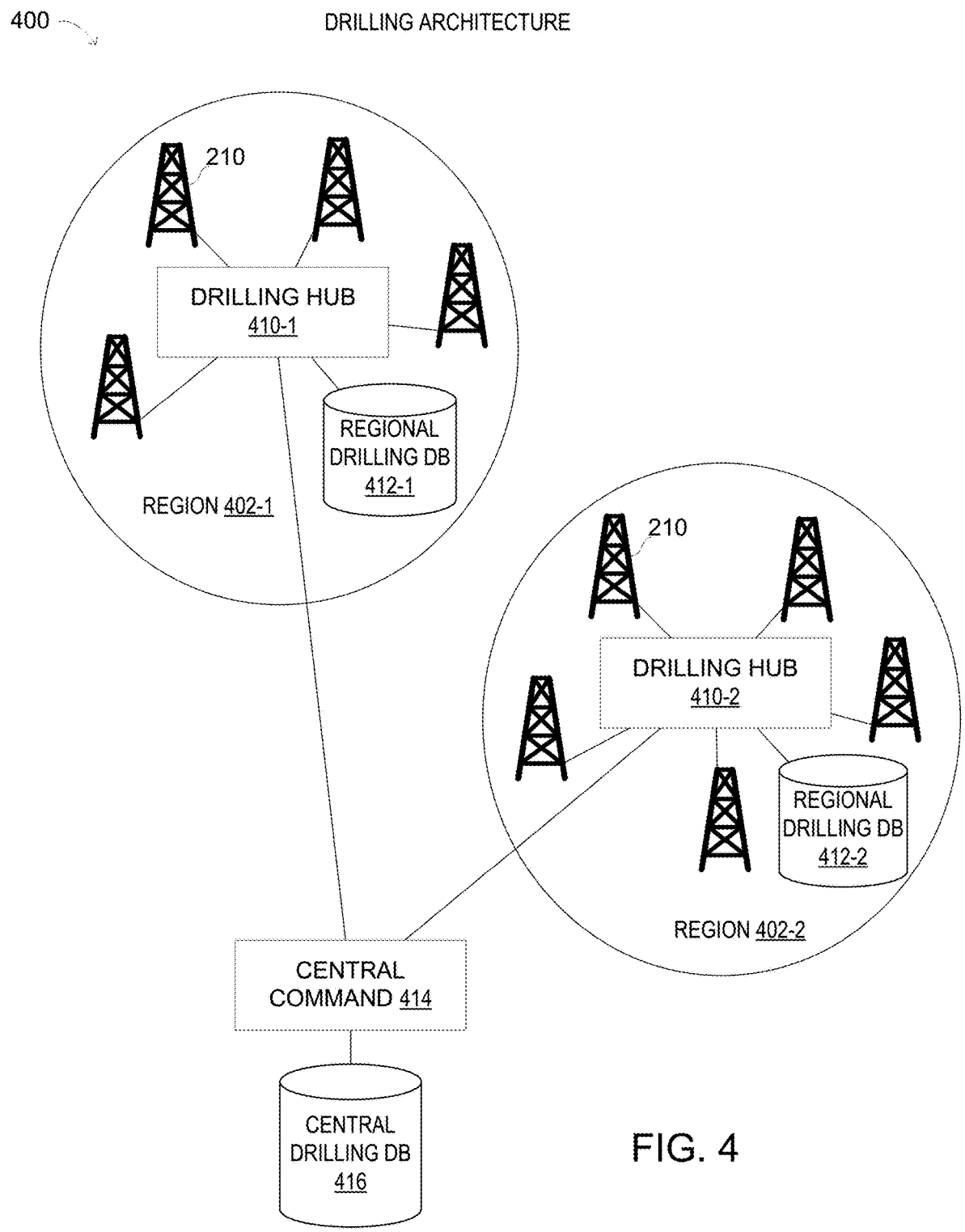
FIG. 4 is a depiction of a drilling architecture including the drilling environment, according to various embodiments.

Referring now to FIG. 4, a drilling architecture 400 is illustrated in diagram form. As shown, drilling architecture 400 depicts a hierarchical arrangement of drilling hubs 410 and a central command 414, to support the operation of a plurality of drilling rigs 210 in different regions 402. Specifically, as described above with respect to FIGS. 1 and 2, drilling rig 210 includes steering control system 168 that is enabled to perform various drilling control operations locally to drilling rig 210. When steering control system 168 is enabled with network connectivity, certain control operations or processing may be requested or queried by steering control system 168 from a remote processing resource. As shown in FIG. 4, drilling hubs 410 represent a remote processing resource for steering control system 168 located at respective regions 402, while central command 414 may represent a remote processing resource for both drilling hub 410 and steering control system 168.

Specifically, in a region 402-1, a drilling hub 410-1 may serve as a remote processing resource for drilling rigs 210 located in region 402-1, which may vary in number and are not limited to the exemplary schematic illustration of FIG. 4. Additionally, drilling hub 410-1 may have access to a regional drilling DB 412-1, which may be local to drilling hub 410-1. Additionally, in a region 402-2, a drilling hub 410-2 may serve as a remote processing resource for drilling rigs 210 located in region 402-2, which may vary in number and are not limited to the exemplary schematic illustration of FIG. 4. Additionally, drilling hub 410-2 may have access to a regional drilling DB 412-2, which may be local to drilling hub 410-2.

In FIG. 4, respective regions 402 may exhibit the same or similar geological formations. Thus, reference wells, or offset wells, may exist in a vicinity of a given drilling rig 210 in region 402, or where a new well is planned in region 402. Furthermore, multiple drilling rigs 210 may be actively drilling concurrently in region 402 and may be in different stages of drilling through the depths of formation strata layers at region 402. Thus, for any given well being drilled by drilling rig 210 in a region 402, survey data from the reference wells or offset wells may be used to create the drill plan and may be used for improved drilling performance. In some implementations, survey data or reference data from a plurality of reference wells may be used to improve drilling performance, such as by reducing an error in estimating TVD or a position of BHA 149 relative to one or more strata layers, as will be described in further detail herein. Additionally, survey data from recently drilled wells, or wells still currently being drilled, including the same well, may be used for reducing an error in estimating TVD or a position of BHA 149 relative to one or more strata layers.

Also shown in FIG. 4 is central command 414, which has access to central drilling DB 416, and may be located at a centralized command center that is in communication with drilling hubs 410 and drilling rigs 210 in various regions 402. The centralized command center may have the ability to monitor drilling and equipment activity at any one or more drilling rigs 210. In some embodiments, central command 414 and drilling hubs 410 may be operated by a commercial operator of drilling rigs 210 as a service to customers who have hired the commercial operator to drill wells and provide other drilling-related services.

In FIG. 4, it is particularly noted that central drilling DB 416 may be a central repository that is accessible to drilling hubs 410 and drilling rigs 210. Accordingly, central drilling DB 416 may store information for various drilling rigs 210 in different regions 402. In some embodiments, central drilling DB 416 may serve as a backup for at least one regional drilling DB 412 or may otherwise redundantly store information that is also stored on at least one regional drilling DB 412. In turn, regional drilling DB 412 may serve as a backup or redundant storage for at least one drilling rig 210 in region 402. For example, regional drilling DB 412 may store information collected by steering control system 168 from drilling rig 210.

In some embodiments, the formulation of a drill plan for drilling rig 210 may include processing and analyzing the collected data in regional drilling DB 412 to create a more effective drill plan. Furthermore, once the drilling has begun, the collected data may be used in conjunction with current data from drilling rig 210 to improve drilling decisions. As noted, the functionality of steering control system 168 may be provided at drilling rig 210, or may be provided, at least in part, at a remote processing resource, such as drilling hub 410 or central command 414.

As noted, steering control system 168 may provide functionality as a surface steerable system for controlling drilling rig 210. Steering control system 168 may have access to regional drilling DB 412 and central drilling DB 416 to provide the surface steerable system functionality. As will be described in greater detail below, steering control system 168 may be used to plan and control drilling operations based on input information, including feedback from the drilling process itself. Steering control system 168 may be used to perform operations such as receiving drilling data representing a drill trajectory and other drilling parameters, calculating a drilling solution for the drill trajectory based on the received data and other available data (e.g., rig characteristics), implementing the drilling solution at drilling rig 210, monitoring the drilling process to gauge whether the drilling process is within a margin of error that is defined for the drill trajectory, or calculating corrections for the drilling process if the drilling process is outside of the margin of error.

Figure 5:
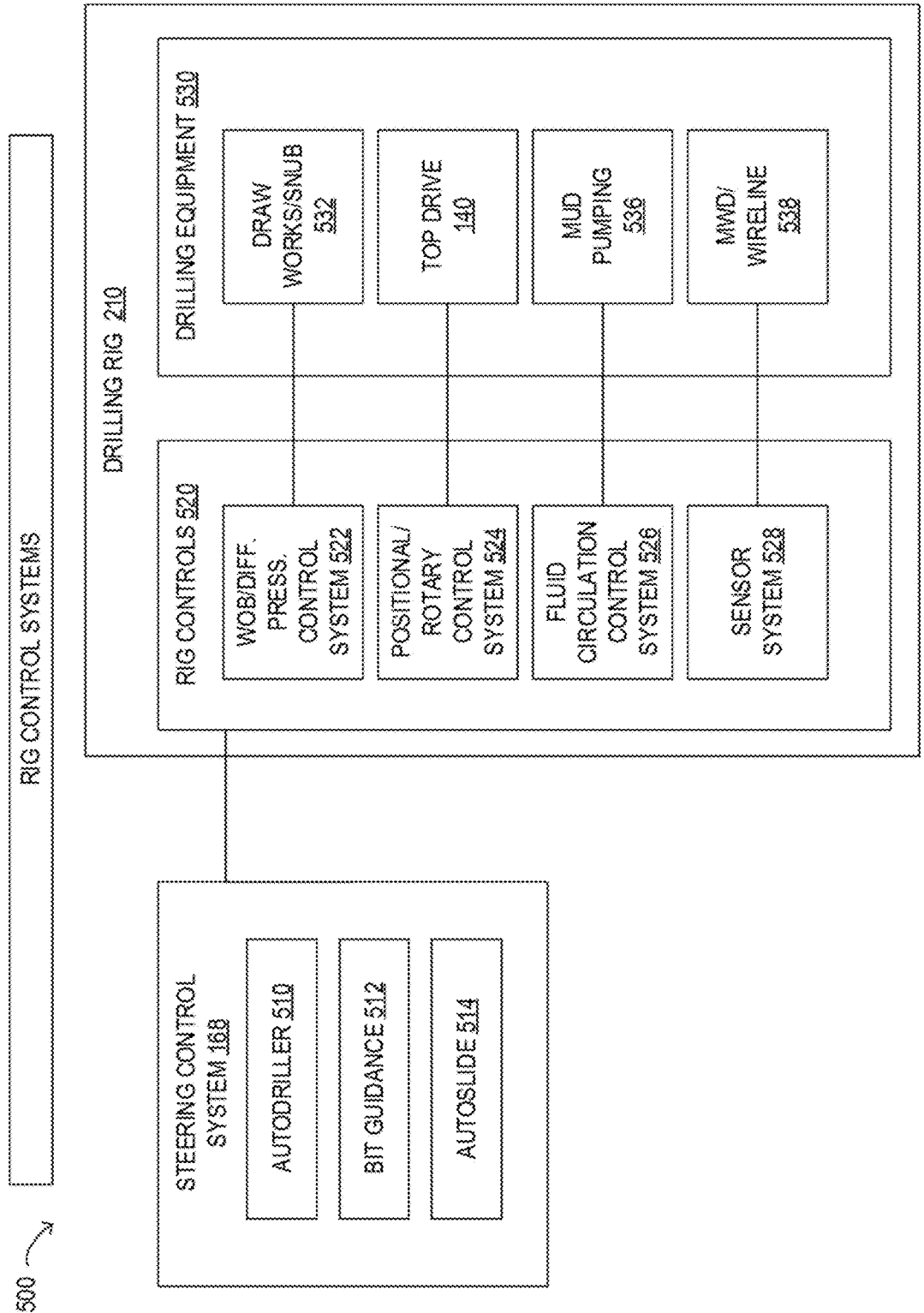
FIG. 5 is a depiction of rig control systems included in the drilling system, according to various embodiments.

Referring now to FIG. 5, an example of rig control systems 500 is illustrated in schematic form. It is noted that rig control systems 500 may include fewer or more elements than shown in FIG. 5 in different embodiments. As shown, rig control systems 500 includes steering control system 168 and drilling rig 210. Specifically, steering control system 168 is shown with logical functionality including an autodriller 510, a bit guidance 512, and an autoslide 514. Drilling rig 210 is hierarchically shown including rig controls 520, which provide secure control logic and processing capability, along with drilling equipment 530, which represents the physical equipment used for drilling at drilling rig 210. As shown, rig controls 520 include WOB/differential pressure control system 522, positional/rotary control system 524, fluid circulation control system 526, and sensor system 528, while drilling equipment 530 includes a draw works/snub 532, top drive 140, mud pumping equipment 536, and MWD/wireline equipment 538.

Figure 10:
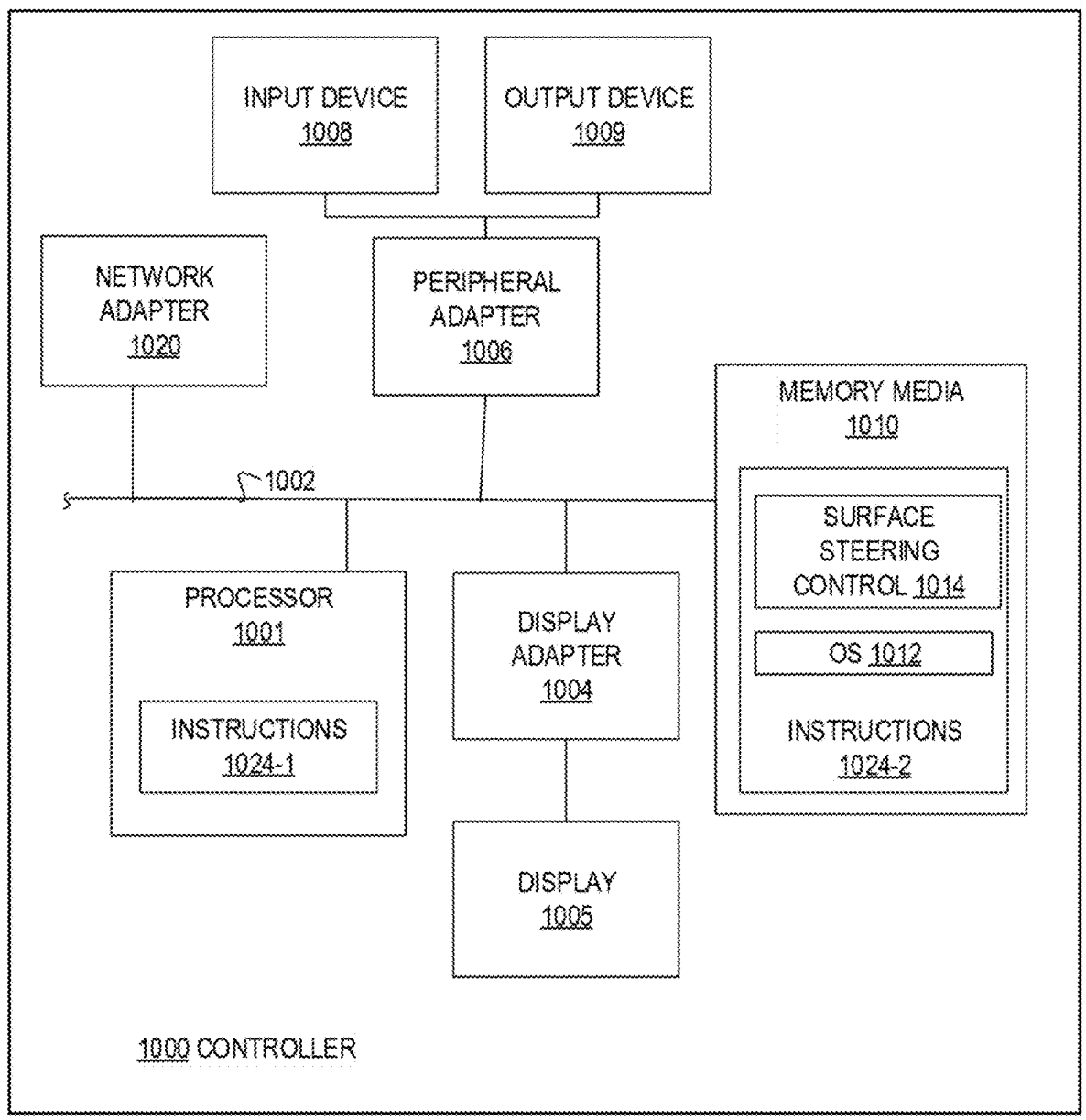
FIG. 10 is a depiction of a controller usable by the rig control systems, according to various embodiments.

Steering control system 168 represent an instance of a processor having an accessible memory storing instructions executable by the processor, such as an instance of controller 1000 shown in FIG. 10. Also, WOB/differential pressure control system 522, positional/rotary control system 524, and fluid circulation control system 526 may each represent an instance of a processor having an accessible memory storing instructions executable by the processor, such as an instance of controller 1000 shown in FIG. 10, but for example, in a configuration as a programmable logic controller (PLC) that may not include a user interface but may be used as an embedded controller. Accordingly, it is noted that each of the systems included in rig controls 520 may be a separate controller, such as a PLC, and may autonomously operate, at least to a degree. Steering control system 168 may represent hardware that executes instructions to implement a surface steerable system that provides feedback and automation capability to an operator, such as a driller. For example, steering control system 168 may cause autodriller 510, bit guidance 512 (also referred to as a bit guidance system (BGS)), and autoslide 514 (among others, not shown) to be activated and executed at an appropriate time during drilling. In particular implementations, steering control system 168 may be enabled to provide a user interface during drilling, such as the user interface 850 depicted and described below with respect to FIG. 8. Accordingly, steering control system 168 may interface with rig controls 520 to facilitate manual, assisted manual, semi-automatic, and automatic operation of drilling equipment 530 included in drilling rig 210. It is noted that rig controls 520 may also accordingly be enabled for manual or user-controlled operation of drilling and may include certain levels of automation with respect to drilling equipment 530.

In rig control systems 500 of FIG. 5, WOB/differential pressure control system 522 may be interfaced with draw works/snubbing unit 532 to control WOB of drill string 146. Positional/rotary control system 524 may be interfaced with top drive 140 to control rotation of drill string 146. Fluid circulation control system 526 may be interfaced with mud pumping equipment 536 to control mud flow and may also receive and decode mud telemetry signals. Sensor system 528 may be interfaced with MWD/wireline equipment 538, which may represent various BHA sensors and instrumentation equipment, among other sensors that may be downhole or at the surface 104.

In rig control systems 500, autodriller 510 may represent an automated rotary drilling system and may be used for controlling rotary drilling. Accordingly, autodriller 510 may enable automate operation of rig controls 520 during rotary drilling, as indicated in the drill plan. Bit guidance 512 may represent an automated control system to monitor and control performance and operation drilling bit 148.

In rig control systems 500, autoslide 514 may represent an automated slide drilling system and may be used for controlling slide drilling. Accordingly, autoslide 514 may enable automate operation of rig controls 520 during a slide and may return control to steering control system 168 for rotary drilling at an appropriate time, as indicated in the drill plan. In particular implementations, autoslide 514 may be enabled to provide a user interface during slide drilling to specifically monitor and control the slide. For example, autoslide 514 may rely on bit guidance 512 for orienting a toolface and on autodriller 510 to set WOB or control rotation or vibration of drill string 146.

Figure 6:
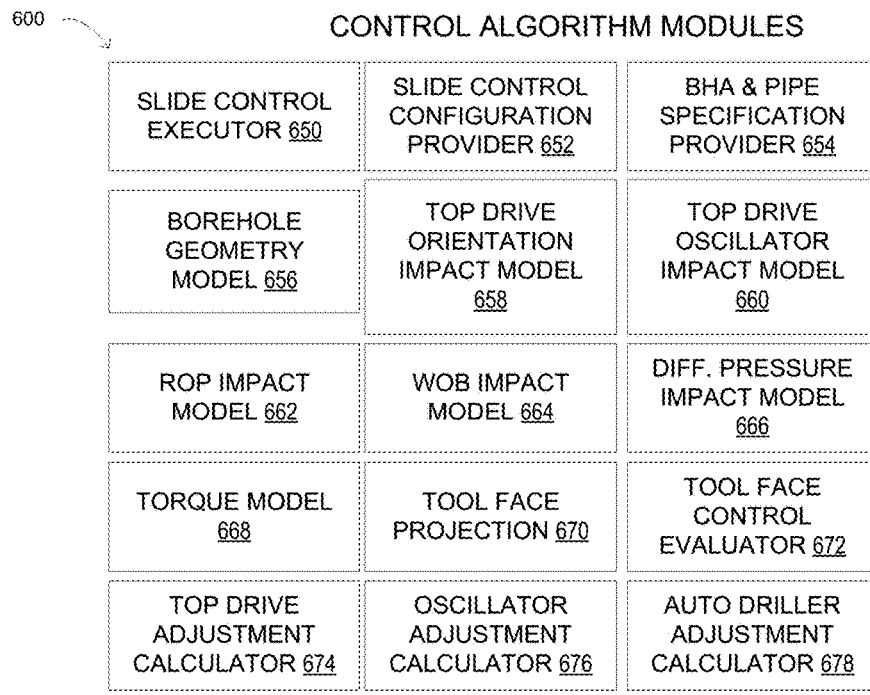
FIG. 6 is a depiction of algorithm modules used by the rig control systems, according to various embodiments.

FIG. 6 illustrates one embodiment of control algorithm modules 600 used with steering control system 168. The control algorithm modules 600 of FIG. 6 include: a slide control executor 650 that is responsible for managing the execution of the slide control algorithms; a slide control configuration provider 652 that is responsible for validating, maintaining, and providing configuration parameters for the other software modules; a BHA 149 & pipe specification provider 654 that is responsible for managing and providing details of BHA 149 and drill string 146 characteristics; a borehole geometry model 656 that is responsible for keeping track of the borehole geometry and providing a representation to other software modules; a top drive orientation impact model 658 that is responsible for modeling the impact that changes to the angular orientation of top drive 140 have had on the toolface control; a top drive oscillator impact model 660 that is responsible for modeling the impact that oscillations of top drive 140 has had on the toolface control; an ROP impact model 662 that is responsible for modeling the effect on the toolface control of a change in ROP or a corresponding ROP set point; a WOB impact model 664 that is responsible for modeling the effect on the toolface control of a change in WOB or a corresponding WOB set point; a differential pressure impact model 666 that is responsible for modeling the effect on the toolface control of a change in differential pressure (DP) or a corresponding DP set point; a torque model 668 that is responsible for modeling the comprehensive representation of torque for surface 104, downhole, break over, and reactive torque, modeling impact of those torque values on toolface control, and determining torque operational thresholds; a toolface control evaluator 672 that is responsible for evaluating all factors impacting toolface control and whether adjustments need to be projected, determining whether re-alignment off-bottom is indicated, and determining off-bottom toolface operational threshold windows; a toolface projection 670 that is responsible for projecting toolface behavior for top drive 140, the top drive oscillator, and autodriller adjustments; a top drive adjustment calculator 674 that is responsible for calculating top drive adjustments resultant to toolface projections; an oscillator adjustment calculator 676 that is responsible for calculating oscillator adjustments resultant to toolface projections; and an autodriller adjustment calculator 678 that is responsible for calculating adjustments to autodriller 510 resultant to toolface projections.

Figure 7:
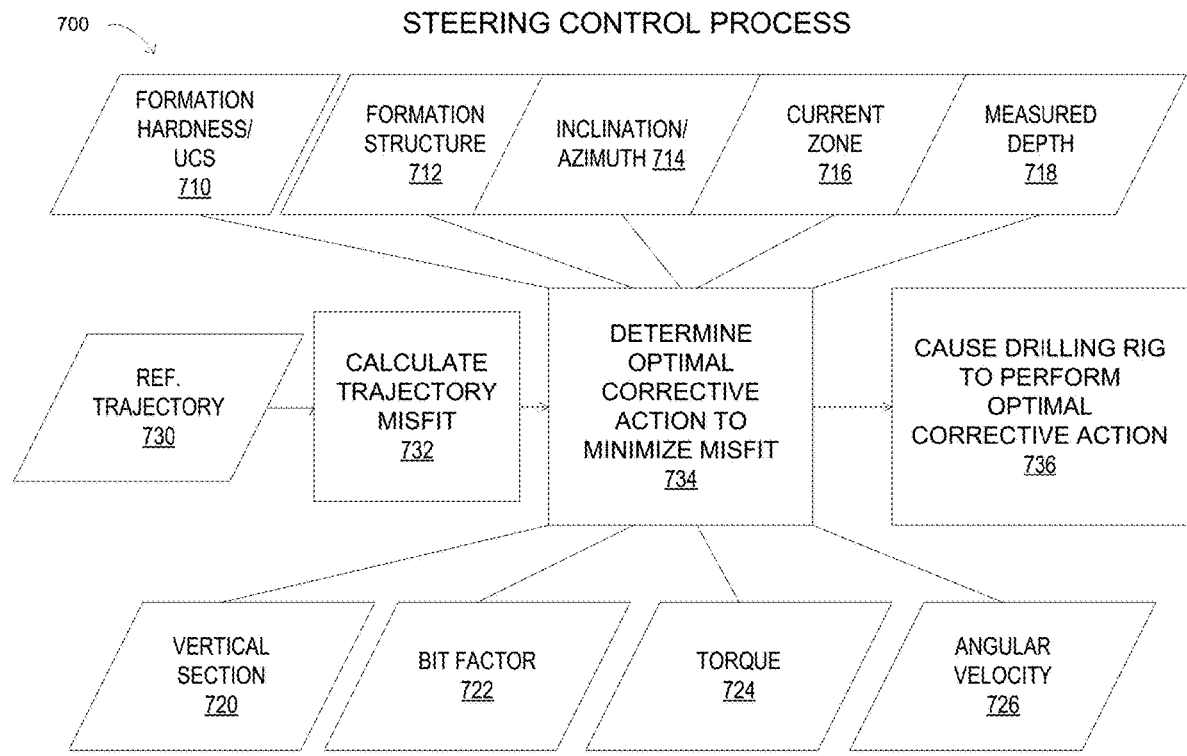
FIG. 7 is a depiction of a steering control process used by the rig control systems, according to various embodiments.

FIG. 7 illustrates one embodiment of a steering control process 700 for determining an optimal corrective action for drilling. Steering control process 700 may be used for rotary drilling or slide drilling in different embodiments.

Steering control process 700 in FIG. 7 illustrates a variety of inputs that can be used to determine an optimum corrective action. As shown in FIG. 7, the inputs include formation hardness/unconfined compressive strength (UCS) 710, formation structure 712, inclination/azimuth 714, current zone 716, measured depth 718, desired toolface, vertical section 720, bit factor 722, mud motor torque 724, reference trajectory 730, and angular velocity 726. In FIG. 7, reference trajectory 730 of borehole 106 is determined to calculate a trajectory misfit in a step 732. Step 732 may output the trajectory misfit to determine an optimal corrective action to minimize the misfit at step 734, which may be performed using the other inputs described above. Then, at step 736, the drilling rig 210 is caused to perform the optimal corrective action.

It is noted that in some implementations, at least certain portions of steering control process 700 may be automated or performed without user intervention, such as using rig control systems (see FIG. 7). In other implementations, the optimal corrective action in step 736 may be provided or communicated (by display, SMS message, email, or otherwise) to one or more human operators, who may then take appropriate action. The human operators may be members of a rig crew, which may be located at or near drilling rig 210 or may be located remotely from drilling rig 210.

Figure 8:
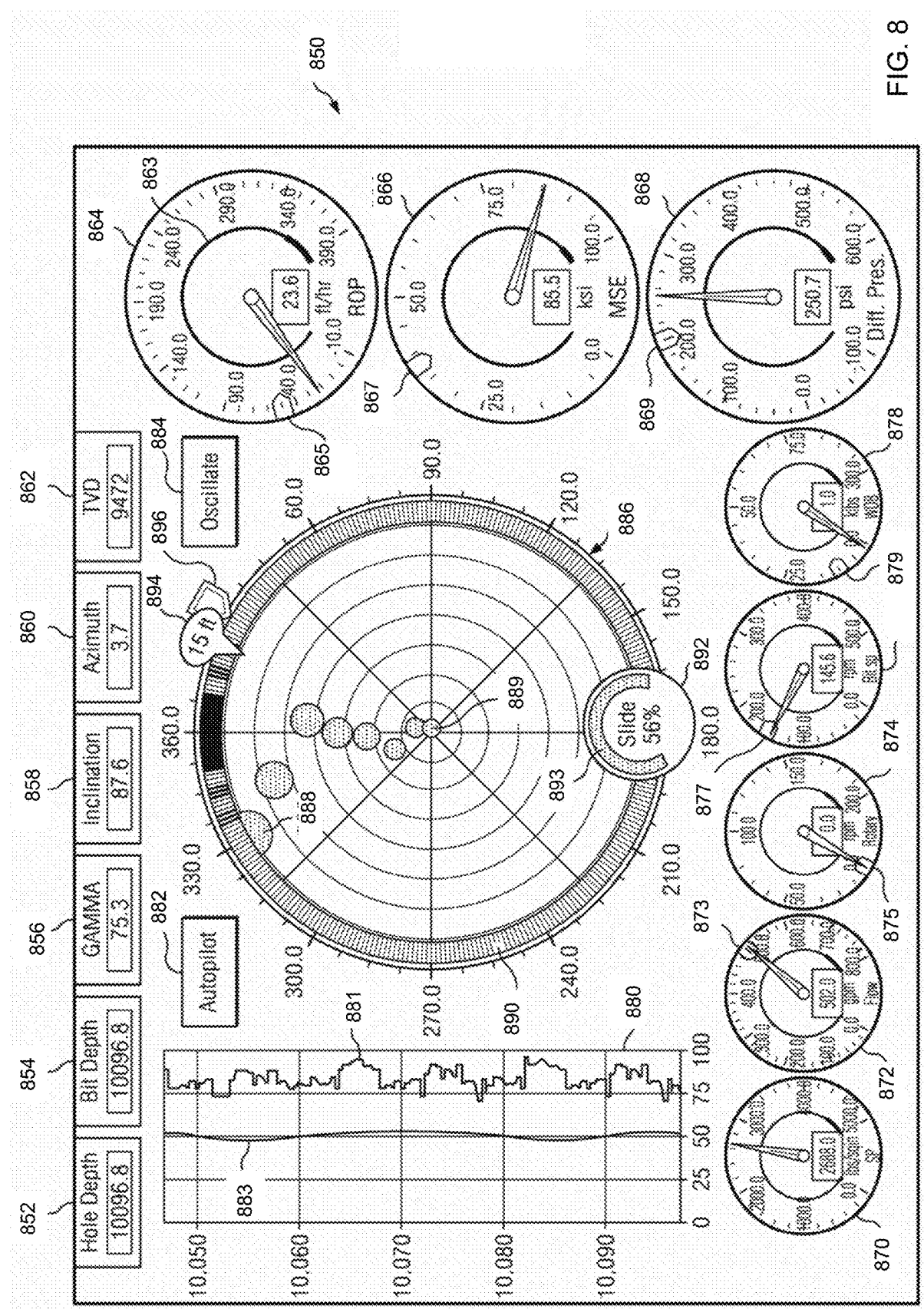
FIG. 8 is a depiction of a graphical user interface provided by the rig control systems, according to various embodiments.

Referring to FIG. 8, one embodiment of a user interface 850 that may be generated by steering control system 168 for monitoring and operation by a human operator is illustrated. User interface 850 may provide many different types of information in an easily accessible format. For example, user interface 850 may be shown on a computer monitor, a television, a viewing screen (e.g., a display device) associated with steering control system 168. In some embodiments, at least certain portions of user interface 850 may be displayed to and operated by a user of steering control system 168 on a mobile device, such as a tablet or a smartphone (see also FIG. 10). For example, steering control system 168 may support mobile applications that enable user interface 850, or other user interfaces, to be used on the mobile device, for example, within a vicinity of drilling rig 210.

As shown in FIG. 8, a user interface 850 provides visual indicators such as a hole depth indicator 852, a bit depth indicator 854, a GAMMA indicator 856, an inclination indicator 858, an azimuth indicator 860, and a TVD indicator 862. Other indicators may also be provided, including a ROP indicator 864, a mechanical specific energy (MSE) indicator 866, a differential pressure indicator 868, a standpipe pressure indicator 870, a flow rate indicator 872, a rotary RPM (angular velocity) indicator 874, a bit speed indicator 876, and a WOB indicator 878.

In FIG. 8, at least some of indicators 864, 866, 868, 870, 872, 874, 876, and 878 may include a marker representing a target value. For example, markers may be set as certain given values, but it is noted that any desired target value may be used. Although not shown, in some embodiments, multiple markers may be present on a single indicator. The markers may vary in color or size. For example, ROP indicator 864 may include a marker 865 indicating that the target value is 50 feet/hour (or 15 miles/hour). MSE indicator 866 may include a marker 867 indicating that the target value is 37 kilograms per square inch (ksi) (or 255 MPa). Differential pressure indicator 868 may include a marker 869 indicating that the target value is 200 pounds per square inch (psi) (or 1,380 kilo Pascal (kPa)). ROP indicator 864 may include a marker 865 indicating that the target value is 50 feet/hour (or 15 miles/hour). Standpipe pressure indicator 870 may have no marker in the present example. Flow rate indicator 872 may include a marker 873 indicating that the target value is 500 gallons per minute (gpm) (or 31.5 liters per second (L/s)). Rotary RPM indicator 874 may include a marker 875 indicating that the target value is 0 RPM (e.g., due to sliding). Bit speed indicator 876 may include a marker 877 indicating that the target value is 150 RPM. WOB indicator 878 may include a marker 879 indicating that the target value is 10 klbs (or 4,500 kg). Each indicator may also include a colored band, or another marking, to indicate, for example, whether the respective gauge value is within a safe range (e.g., indicated by a green color), within a caution range (e.g., indicated by a yellow color), or within a danger range (e.g., indicated by a red color).

In FIG. 8, a log chart 880 may visually indicate depth versus one or more measurements (e.g., may represent log inputs relative to a progressing depth chart). For example, log chart 880 may have a Y-axis representing depth and an X-axis representing a measurement such as GAMMA count 881 (as shown), ROP 883 (e.g., empirical ROP and normalized ROP), or resistivity. An autopilot button 882 and an oscillate button 884 may be used to control activity. For example, autopilot button 882 may be used to engage or disengage autodriller 510, while oscillate button 884 may be used to directly control oscillation of drill string 146 or to engage/disengage an external hardware device or controller.

In FIG. 8, a circular chart 886 may provide current and historical toolface orientation information (e.g., which way the bend is pointed). For purposes of illustration, circular chart 886 represents three hundred and sixty degrees. A series of circles within circular chart 886 may represent a timeline of toolface orientations, with the sizes of the circles indicating the temporal position of each circle. For example, larger circles may be more recent than smaller circles, so a largest circle 888 may be the newest reading and a smallest circle 889 may be the oldest reading. In other embodiments, circles 889, 888 may represent the energy or progress made via size, color, shape, a number within a circle, etc. For example, a size of a particular circle may represent an accumulation of orientation and progress for the period of time represented by the circle. In other embodiments, concentric circles representing time (e.g., with the outside of circular chart 886 being the most recent time and the center point being the oldest time) may be used to indicate the energy or progress (e.g., via color or patterning such as dashes or dots rather than a solid line).

In user interface 850, circular chart 886 may also be color coded, with the color coding existing in a band 890 around circular chart 886 or positioned or represented in other ways. The color coding may use colors to indicate activity in a certain direction. For example, the color red may indicate the highest level of activity, while the color blue may indicate the lowest level of activity. Furthermore, the arc range in degrees of a color may indicate the amount of deviation. Accordingly, a relatively narrow (e.g., thirty degrees) arc of red with a relatively broad (e.g., three hundred degrees) arc of blue may indicate that most activity is occurring in a particular toolface orientation with little deviation. As shown in user interface 850, the color blue may extend from approximately 22-337 degrees, the color green may extend from approximately 15-22 degrees and 337-345 degrees, the color yellow may extend a few degrees around the 13- and 345-degree marks, while the color red may extend from approximately 347-10 degrees. Transition colors or shades may be used with, for example, the color orange marking the transition between red and yellow or a light blue marking the transition between blue and green. This color coding may enable user interface 850 to provide an intuitive summary of how narrow the standard deviation is and how much of the energy intensity is being expended in the proper direction. Furthermore, the center of energy may be viewed relative to the target. For example, user interface 850 may clearly show that the target is at 90 degrees, but the center of energy is at 45 degrees.

In user interface 850, other indicators, such as a slide indicator 892, may indicate how much time remains until a slide occurs or how much time remains for a current slide. For example, slide indicator 892 may represent a time, a percentage (e.g., as shown, a current slide may be 56% complete), a distance completed, or a distance remaining. Slide indicator 892 may graphically display information using, for example, a colored bar 893 that increases or decreases with slide progress. In some embodiments, slide indicator 892 may be built into circular chart 886 (e.g., around the outer edge with an increasing/decreasing band), while in other embodiments slide indicator 892 may be a separate indicator such as a meter, a bar, a gauge, or another indicator type. In various implementations, slide indicator 892 may be refreshed by autoslide 514.

In user interface 850, an error indicator 894 may indicate a magnitude and a direction of error. For example, error indicator 894 may indicate that an estimated drill bit position is a certain distance from the planned trajectory, with a location of error indicator 894 around the circular chart 886 representing the heading. For example, FIG. 8 illustrates an error magnitude of 15 feet and an error direction of 15 degrees. Error indicator 894 may be any color but may be red for purposes of example. It is noted that error indicator 894 may present a zero if there is no error. Error indicator may represent that drill bit 148 is on the planned trajectory using other means, such as being a green color. Transition colors, such as yellow, may be used to indicate varying amounts of error. In some embodiments, error indicator 894 may not appear unless there is an error in magnitude or direction. A marker 896 may indicate an ideal slide direction. Although not shown, other indicators may be present, such as a bit life indicator to indicate an estimated lifetime for the current bit based on a value such as time or distance.

It is noted that user interface 850 may be arranged in many different ways. For example, colors may be used to indicate normal operation, warnings, and problems. In such cases, the numerical indicators may display numbers in one color (e.g., green) for normal operation, may use another color (e.g., yellow) for warnings, and may use yet another color (e.g., red) when a serious problem occurs. The indicators may also flash or otherwise indicate an alert. The gauge indicators may include colors (e.g., green, yellow, and red) to indicate operational conditions and may also indicate the target value (e.g., an ROP of 100 feet/hour). For example, ROP indicator 864 may have a green bar to indicate a normal level of operation (e.g., from 10-300 feet/hour), a yellow bar to indicate a warning level of operation (e.g., from 300-360 feet/hour), and a red bar to indicate a dangerous or otherwise out of parameter level of operation (e.g., from 360-390 feet/hour). ROP indicator 864 may also display a marker at 100 feet/hour to indicate the desired target ROP.

Furthermore, the use of numeric indicators, gauges, and similar visual display indicators may be varied based on factors such as the information to be conveyed and the personal preference of the viewer. Accordingly, user interface 850 may provide a customizable view of various drilling processes and information for a particular individual involved in the drilling process. For example, steering control system 168 may enable a user to customize the user interface 850 as desired, although certain features (e.g., standpipe pressure) may be locked to prevent a user from intentionally or accidentally removing important drilling information from user interface 850. Other features and attributes of user interface 850 may be set by user preference. Accordingly, the level of customization and the information shown by the user interface 850 may be controlled based on who is viewing user interface 850 and their role in the drilling process.

Figure 9:
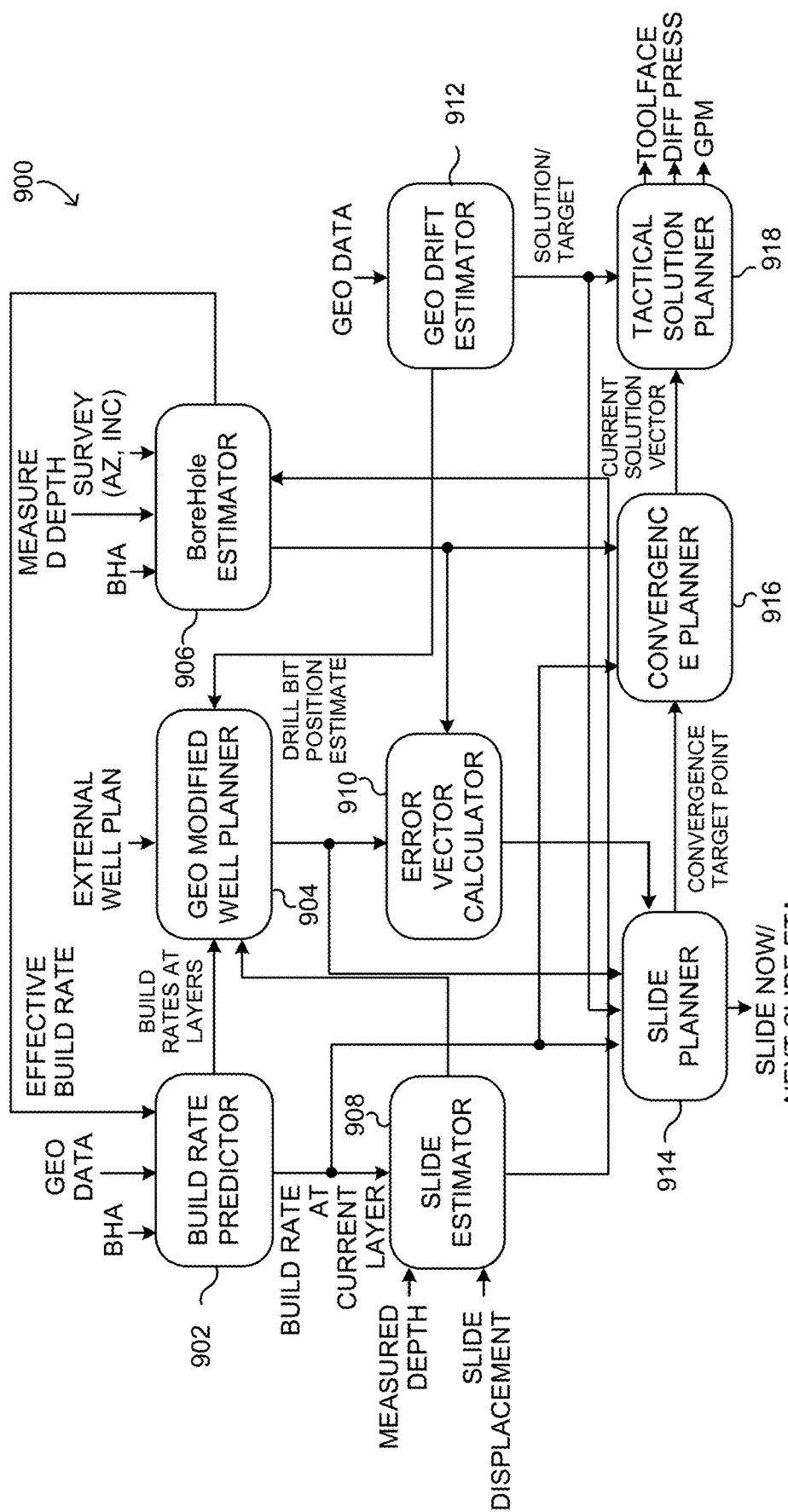
FIG. 9 is a depiction of a guidance control loop performed by the rig control systems, according to various embodiments.

Referring to FIG. 9, one embodiment of a guidance control loop (GCL) 900 is shown in further detail GCL 900 may represent one example of a control loop or control algorithm executed under the control of steering control system 168. GCL 900 may include various functional modules, including a build rate predictor 902, a geo modified well planner 904, a borehole estimator 906, a slide estimator

908, an error vector calculator 910, a geological drift estimator 912, a slide planner 914, a convergence planner 916, and a tactical solution planner 918. In the following description of GCL 900, the term "external input" refers to input received from outside GCL 900, while "internal input" refers to input exchanged between functional modules of GCL 900.

In FIG. 9, build rate predictor 902 receives external input representing BHA information and geological information, receives internal input from the borehole estimator 906, and provides output to geo modified well planner 904, slide estimator 908, slide planner 914, and convergence planner 916. Build rate predictor 902 is configured to use the BHA information and geological information to predict drilling build rates of current and future sections of borehole 106. For example, build rate predictor 902 may determine how aggressively a curve will be built for a given formation with BHA 149 and other equipment parameters.

In FIG. 9, build rate predictor 902 may use the orientation of BHA 149 to the formation to determine an angle of attack for formation transitions and build rates within a single layer of a formation. For example, if a strata layer of rock is below a strata layer of sand, a formation transition exists between the strata layer of sand and the strata layer of rock. Approaching the strata layer of rock at a 90-degree angle may provide a good toolface and a clean drill entry, while approaching the rock layer at a 45-degree angle may build a curve relatively quickly. An angle of approach that is near parallel may cause drill bit 148 to skip off the upper surface of the strata layer of rock. Accordingly, build rate predictor 902 may calculate BHA orientation to account for formation transitions. Within a single strata layer, build rate predictor 902 may use the BHA orientation to account for internal layer characteristics (e.g., grain) to determine build rates for different parts of a strata layer. The BHA information may include bit characteristics, mud motor bend setting, stabilization, and mud motor bit to bend distance. The geological information may include formation data such as compressive strength, thicknesses, and depths for formations encountered in the specific drilling location. Such information may enable a calculation-based prediction of the build rates and ROP that may be compared to both results obtained while drilling borehole 106 and regional historical results (e.g., from the regional drilling DB 412) to improve the accuracy of predictions as drilling progresses. Build rate predictor 902 may also be used to plan convergence adjustments and confirm in advance of drilling that targets can be achieved with current parameters.

In FIG. 9, geo modified well planner 904 receives external input representing a drill plan, internal input from build rate predictor 902 and geological drift estimator 912 and provides output to slide planner 914 and error vector calculator 910. Geo modified well planner 904 uses the input to determine whether there is a more optimal trajectory than that provided by the drill plan, while staying within specified error limits. More specifically, geo modified well planner 904 takes geological information (e.g., drift) and calculates whether another trajectory solution to the target may be more efficient in terms of cost or reliability. The outputs of geo modified well planner 904 to slide planner 914 and error vector calculator 910 may be used to calculate an error vector based on the current vector to the newly calculated trajectory and to modify slide predictions. In some embodiments, geo modified well planner 904 (or another module) may provide functionality needed to track a formation trend. For example, in horizontal wells, a geologist may provide steering control system 168 with a target inclination as a set point for steering control system 168 to control. For example, the geologist may enter a target to steering control system 168 of 90.5-91.0 degrees of inclination for a section of borehole 106. Geo modified well planner 904 may then treat the target as a vector target, while remaining within the error limits of the original drill plan. In some embodiments, geo modified well planner 904 may be an optional module that is not used unless the drill plan is to be modified. For example, if the drill plan is marked in steering control system 168 as non-modifiable, geo modified well planner 904 may be bypassed altogether or geo modified well planner 904 may be configured to pass the drill plan through without any changes.

In FIG. 9, borehole estimator 906 may receive external inputs representing BHA information, measured depth information, survey information (e.g., azimuth and inclination), and may provide outputs to build rate predictor 902, error vector calculator 910, and convergence planner 916. Borehole estimator 906 may be configured to provide an estimate of the actual borehole and drill bit position and trajectory angle without delay, based on either straight-line projections or projections that incorporate sliding. Borehole estimator 906 may be used to compensate for a sensor being physically located some distance behind drill bit 148 (e.g., 50 feet) in drill string 146, which makes sensor readings lag the actual bit location by 50 feet. Borehole estimator 906 may also be used to compensate for sensor measurements that may not be continuous (e.g., a sensor measurement may occur every 100 feet). Borehole estimator 906 may provide the most accurate estimate from the surface 104 to the last survey location based on the collection of survey measurements. Also, borehole estimator 906 may take the slide estimate from slide estimator 908 (described below) and extend the slide estimate from the last survey point to a current location of drill bit 148. Using the combination of these two estimates, borehole estimator 906 may provide steering control system 168 with an estimate of the drill bit's 148 location and trajectory angle from which guidance and steering solutions can be derived. An additional metric that can be derived from the borehole estimate is the effective build rate that is achieved throughout the drilling process.

In FIG. 9, slide estimator 908 receives external inputs representing measured depth and differential pressure information, receives internal input from build rate predictor 902, and provides output to borehole estimator 906 and geo modified well planner 904. Slide estimator 908 may be configured to sample toolface orientation, differential pressure, measured depth (MD) incremental movement, MSE, and other sensor feedback to quantify/estimate a deviation vector and progress while sliding.

Traditionally, deviation from the slide would be predicted by a human operator based on experience. The operator would, for example, use a long slide cycle to assess what likely was accomplished during the last slide. However, the results are generally not confirmed until the downhole survey sensor point passes the slide portion of the borehole, often resulting in a response lag defined by a distance of the sensor point from the drill bit tip (e.g., approximately 50 feet). Such a response lag may introduce inefficiencies in the slide cycles due to over/under correction of the actual trajectory relative to the planned trajectory.

In GCL 900, using slide estimator 908, each toolface update may be algorithmically merged with the average differential pressure of the period between the previous and current toolface readings, as well as the MD change during this period to predict the direction, angular deviation, and MD progress during the period. As an example, the periodic rate may be between 10 and 60 seconds per cycle depending on the toolface update rate of downhole tool 166. With a more accurate estimation of the slide effectiveness, the sliding efficiency can be improved. The output of slide estimator 908 may accordingly be periodically provided to borehole estimator 906 for accumulation of well deviation information, as well to geo modified well planner 904. Some or all of the output of the slide estimator 908 may be output to an operator, such as shown in the user interface 850 of FIG. 8.

In FIG. 9, error vector calculator 910 may receive internal input from geo modified well planner 904 and borehole estimator 906. Error vector calculator 910 may be configured to compare the planned well trajectory to an actual borehole trajectory and drill bit position estimate. Error vector calculator 910 may provide the metrics used to determine the error (e.g., how far off) the current drill bit position and trajectory are from the drill plan. For example, error vector calculator 910 may calculate the error between the current bit position and trajectory to the planned trajectory and the desired bit position. Error vector calculator 910 may also calculate a projected bit position/projected trajectory representing the future result of a current error.

In FIG. 9, geological drift estimator 912 receives external input representing geological information and provides outputs to geo modified well planner 904, slide planner 914, and tactical solution planner 918. During drilling, drift may occur as the particular characteristics of the formation affect the drilling direction. More specifically, there may be a trajectory bias that is contributed by the formation as a function of ROP and BHA 149. Geological drift estimator 912 is configured to provide a drift estimate as a vector that can then be used to calculate drift compensation parameters that can be used to offset the drift in a control solution.

In FIG. 9, slide planner 914 receives internal input from build rate predictor 902, geo modified well planner 904, error vector calculator 910, and geological drift estimator 912, and provides output to convergence planner 916 as well as an estimated time to the next slide. Slide planner 914 may be configured to evaluate a slide/drill ahead cost equation and plan for sliding activity, which may include factoring in BHA wear, expected build rates of current and expected formations, and the drill plan trajectory. During drill ahead, slide planner 914 may attempt to forecast an estimated time of the next slide to aid with planning. For example, if additional lubricants (e.g., fluorinated beads) are indicated for the next slide, and pumping the lubricants into drill string 146 has a lead time of 30 minutes before the slide, the estimated time of the next slide may be calculated and then used to schedule when to start pumping the lubricants. Functionality for a loss circulation material (LCM) planner may be provided as part of slide planner 914 or elsewhere (e.g., as a stand-alone module or as part of another module described herein). The LCM planner functionality may be configured to determine whether additives should be pumped into the borehole based on indications such as flow-in versus flow-back measurements. For example, if drilling through a porous rock formation, fluid being pumped into the borehole may get lost in the rock formation. To address this issue, the LCM planner may control pumping LCM into the borehole to clog up the holes in the porous rock surrounding the borehole to establish a more closed-loop control system for the fluid.

In FIG. 9, slide planner 914 may also look at the current position relative to the next connection. A passageway may happen every 90 to 100 feet (or some other distance or distance range based on the particulars of the drilling operation) and slide planner 914 may avoid planning a slide when close to a passageway or when the slide would carry through the connection. For example, if the slide planner 914 is planning a 50-foot slide but only 20 feet remain until the next connection, slide planner 914 may calculate the slide starting after the next passageway and make any changes to the slide parameters to accommodate waiting to slide until after the next connection. Such flexible implementation avoids inefficiencies that may be caused by starting the slide, stopping for the connection, and then having to reorient the toolface before finishing the slide. During slides, slide planner 914 may provide some feedback as to the progress of achieving the desired goal of the current slide. In some embodiments, slide planner 914 may account for reactive torque in the drill string 146. More specifically, when rotating is occurring, there is a reactional torque wind up in drill string 146. When the rotating is stopped, drill string 146 unwinds, which changes toolface orientation and other parameters. When rotating is started again, drill string 146 starts to wind back up. Slide planner 914 may account for the reactional torque so that toolface references are maintained, rather than stopping rotation and then trying to adjust to an optimal toolface orientation. While not all downhole tools may provide toolface orientation when rotating, using one that does supply such information for GCL 900 may significantly reduce the transition time from rotating to sliding.

In FIG. 9, convergence planner 916 receives internal inputs from build rate predictor 902, borehole estimator 906, and slide planner 914, and provides output to tactical solution planner 918. Convergence planner 916 is configured to provide a convergence plan when the current drill bit position is not within a defined margin of error of the planned well trajectory. The convergence plan represents a path from the current drill bit position to an achievable and optimal convergence target point along the planned trajectory. The convergence plan may take account the amount of sliding/drilling ahead that has been planned to take place by slide planner 914. Convergence planner 916 may also use BHA orientation information for angle of attack calculations when determining convergence plans as described above with respect to build rate predictor 902. The solution provided by convergence planner 916 defines a new trajectory solution for the current position of drill bit 148. The solution may be immediate without delay or planned for implementation at a future time that is specified in advance.

In FIG. 9, tactical solution planner 918 receives internal inputs from geological drift estimator 912 and convergence planner 916 and provides external outputs representing information such as toolface orientation, differential pressure, and mud flow rate. Tactical solution planner 918 is configured to take the trajectory solution provided by convergence planner 916 and translate the solution into control parameters that can be used to control drilling rig 210. For example, tactical solution planner 918 may convert the solution into settings for control systems 522, 524, and 526 to accomplish the actual drilling based on the solution. Tactical solution planner 918 may also perform performance optimization to optimizing the overall drilling operation as well as optimizing the drilling itself (e.g., how to drill faster).

Other functionality may be provided by GCL 900 in additional modules or added to an existing module. For example, there is a relationship between the rotational position of the drill pipe 144 on the surface 104 and the orientation of the downhole toolface. Accordingly, GCL 900 may receive information corresponding to the rotational position of the drill pipe 144 on the surface 104. GCL 900 may use this surface positional information to calculate current and desired toolface orientations. These calculations may then be used to define control parameters for adjusting the top drive 140 to accomplish adjustments to the downhole toolface in order to steer the trajectory of borehole 106.

For purposes of example, an object-oriented software approach may be utilized to provide a class-based structure that may be used with GCL 900, or other functionality provided by steering control system 168. In GCL 900, a drilling model class may be defined to capture and define the drilling state throughout the drilling process. The drilling model class may include information obtained without delay. The drilling model class may be based on the following components and sub-models: a drill bit model, a borehole model, a rig surface gear model, a mud pump model, a/differential pressure model, a positional/rotary model, an MSE model, an active drill plan, and control limits. The drilling model class may produce a control output solution and may be executed via a main processing loop that rotates through the various modules of GCL 900. The drill bit model may represent the current position and state of drill bit 148. The drill bit model may include a three-dimensional (3D) position, a drill bit trajectory, BHA information, bit speed, and toolface (e.g., orientation information). The 3D position may be specified in north-south (NS), east-west (EW), and TVD. The drill bit trajectory may be specified as an inclination angle and an azimuth angle. The BHA information may be a set of dimensions defining the active BHA 149. The borehole model may represent the current path and size of the active borehole. The borehole model may include hole depth information, an array of survey points collected along the borehole path, a gamma log, and borehole diameters. The hole depth information is for current drilling of borehole 106. The borehole diameters may represent the diameters of borehole 106 as drilled over current drilling. The rig surface gear model may represent pipe length, block height, and other models, such as the mud pump model, WOB/differential pressure model, positional/rotary model, and MSE model. The mud pump model represents mud pump equipment and includes flow rate, standpipe pressure, and differential pressure. The WOB/differential pressure model represents draw works or other WOB/differential pressure controls and parameters, including WOB. The positional/rotary model represents top drive 140 or other positional/rotary controls and parameters including rotary RPM and spindle position. The active drill plan represents the target borehole path and may include an external drill plan and a modified drill plan. The control limits represent defined parameters that may be set as maximums and/or minimums. For example, control limits may be set for the rotary RPM in the top drive model to limit the maximum RPMs to the defined level. The control output solution may represent the control parameters for drilling rig 210.

Each functional module of GCL 900 may have behavior encapsulated within a respective class definition. During a processing window, the individual functional modules may have an exclusive portion in time to execute and update the drilling model. For purposes of example, the processing order for the functional modules may be in the sequence of geo modified well planner 904, build rate predictor 902, slide estimator 908, borehole estimator 906, error vector calculator 910, slide planner 914, convergence planner 916, geological drift estimator 912, and tactical solution planner 918. It is noted that other sequences may be used in different implementations.

In FIG. 9, GCL 900 may rely on a programmable timer module that provides a timing mechanism to provide timer event signals to drive the main processing loop. While steering control system 168 may rely on timer and date calls driven by the programming environment, timing may be obtained from other sources than system time. In situations where it may be advantageous to manipulate the clock (e.g., for evaluation and testing), a programmable timer module may be used to alter the system time. For example, the programmable timer module may enable a default time set to the system time and a time scale of 1.0, may enable the system time of steering control system 168 to be manually set, may enable the time scale relative to the system time to be modified, or may enable periodic event time requests scaled to a requested time scale.

Referring now to FIG. 10, a block diagram illustrating selected elements of an embodiment of a controller 1000 for performing steering methods and systems for improved drilling performance according to the present disclosure. In various embodiments, controller 1000 may represent an implementation of steering control system 168. In other embodiments, at least certain portions of controller 1000 may be used for control systems 510, 512, 514, 522, 524, and 526 (see FIG. 5).

In the embodiment depicted in FIG. 10, controller 1000 includes processor 1001 coupled via shared bus 1002 to storage media collectively identified as memory media 1010.

Controller 1000, as depicted in FIG. 10, further includes network adapter 1020 that interfaces controller 1000 to a network (not shown in FIG. 10). In embodiments suitable for use with user interfaces, controller 1000, as depicted in FIG. 10, may include peripheral adapter 1006, which provides connectivity for the use of input device 1008 and output device 1009. Input device 1008 may represent a device for user input, such as a keyboard or a mouse, or even a video camera. Output device 1009 may represent a device for providing signals or indications to a user, such as loudspeakers for generating audio signals.

Controller 1000 is shown in FIG. 10 including display adapter 1004 and further includes a display device 1005. Display adapter 1004 may interface shared bus 1002, or another bus, with an output port for one or more display devices, such as display device 1005. Display device 1005 may be implemented as a liquid crystal display screen, a computer monitor, a television, or the like. Display device 1005 may comply with a display standard for the corresponding type of display. Standards for computer monitors include analog standards such as video graphics array (VGA), extended graphics array (XGA), etc., or digital standards such as digital visual interface (DVI), definition multimedia interface (HDMI), among others. A television display may comply with standards such as NTSC (National Television System Committee), PAL (Phase Alternating Line), or another suitable standard. Display device 1005 may include an output device 1009, such as one or more integrated speakers to play audio content, or may include an input device 1008, such as a microphone or video camera.

In FIG. 10, memory media 1010 encompasses persistent and volatile media, fixed and removable media, and magnetic and semiconductor media. Memory media 1010 is operable to store instructions, data, or both. Memory media 1010 as shown includes sets or sequences of instructions 1024-2, namely, an operating system 1012 and steering control 1014. Operating system 1012 may be a UNIX or UNIX-like operating system, a Windows® family operating system, or another suitable operating system. Instructions 1024 may also reside, completely or at least partially, within processor 1001 during execution thereof. It is further noted that processor 1001 may be configured to receive instructions 1024-1 from instructions 1024-2 via shared bus 1002. In some embodiments, memory media 1010 is configured to store and provide executable instructions for executing GCL 900, as mentioned previously, among other methods and operations disclosed herein.

As noted previously, steering control system 168 may support the display and operation of various user interfaces, such as in a client/server architecture. For example, steering control 1014 may be enabled to support a web server for providing the user interface to a web browser client, such as on a mobile device or on a personal computer device. In another example, steering control 1014 may be enabled to support an app server for providing the user interface to a client app, such as on a mobile device or on a personal computer device. It is noted that in the web server or the app server architecture, surface steering control 1014 may handle various communications to rig controls 520 while simultaneously supporting the web browser client or the client app with the user interface.

Systems and Methods for Drilling a Geothermal Well

Geothermal energy is heat derived within the sub-surface of the earth. Heated fluids like water, brine, and/or steam can carry the geothermal energy to the Earth's surface. Depending on its characteristics, geothermal energy can be used for heating and cooling purposes or can be harnessed to generate clean electricity, such as by providing the heated fluid to a turbine generator. However, for electricity generation high or medium temperature resources are needed, which are usually located close to tectonically active regions.

Conventional geothermal power plants typically use hydrothermal resources that have both water (hydro) and heat (thermal). Such geothermal power plants typically require high-temperature (e.g., 300° F. to 700° F.) hydrothermal resources that come from either dry steam wells or from hot water wells. People use these resources by drilling wells into the earth and then piping steam or hot water to the surface 104. The hot water or steam can power a turbine that generates electricity. Some geothermal wells are as much as two miles deep.

There are three basic types of geothermal power plants: dry steam plants, flash steam plants, and binary cycle power plants. Dry steam plants use steam directly from a geothermal reservoir to turn generator turbines. Flash steam plants take high-pressure hot water from deep inside the earth and convert it to steam to drive generator turbines. When the steam cools, it condenses to water and is injected back into the ground to be used again. Most geothermal power plants are flash steam plants. Binary cycle power plants transfer the heat from geothermal hot water to another liquid. The heat causes the second liquid to turn to steam, which is used to drive a generator turbine.

Geothermal power generation can provide several advantages. Geothermal energy can be more environmentally friendly than conventional fuel sources. Geothermal energy can be a source of renewable energy. The number of exploitable geothermal resources is expected to increase with ongoing research and development in the industry. Geothermal energy is a sustainable source of energy that can be consistently available unlike some other renewable energy sources (e.g., wind and solar power). Geothermal energy can be a reliable source of energy and it can be easier to predict the power output from a geothermal plant with a high degree of accuracy. No additional fuel may be required for geothermal energy. New technologies are being created to improve the energy process as a result of increase in exploration. Geothermal energy production can result in much lower pollution levels as compared to fossil fuels.

A major disadvantage of geothermal energy is that it is location specific. For example, geothermal energy may be economic in places like Iceland, Alaska, and East Asia, but these locations have access to a shallow heat source. Deeper wells are required elsewhere and thus cost much more. Additional disadvantages can include the release of gasses into the atmosphere during digging. Some geothermal wells can present a risk of triggering earthquakes. Currently, geothermal energy can be expensive to exploit with high upfront costs ranging from around $2 million to $7 million for a plant with a 1-megawatt capacity. Another disadvantage can include that the energy fluid can be required to be pumped back into the underground reservoirs faster than it is depleted. Management can be required to maintain sustainability.

In order to offset various disadvantages and improve the efficiency of geothermal wells, several techniques and devices have been developed. These techniques can determine the most cost-effective way of exposing maximum circulation to maximum heat. These techniques can adapt existing oil and gas technologies for maximum benefit of geothermal energy systems. These techniques can reduce drilling time to a minimum while simultaneously maximizing heat production (and thus energy generation) over time.

Some current implementations of a geothermal well require the drilling of two vertical wells. One of the vertical wells can be used for injection and the other vertical well can be used for the recovery of the hot water or steam. However, the cost of drilling two vertical wells for use for geothermal power generation can be cost prohibitive, especially in location where a deeper well is required to access a geothermal heat source. Therefore, techniques that only require the drilling of a single vertical well that can be used for both injection and recovery would reduce drilling costs and be more economically feasible.

Figure 11C:
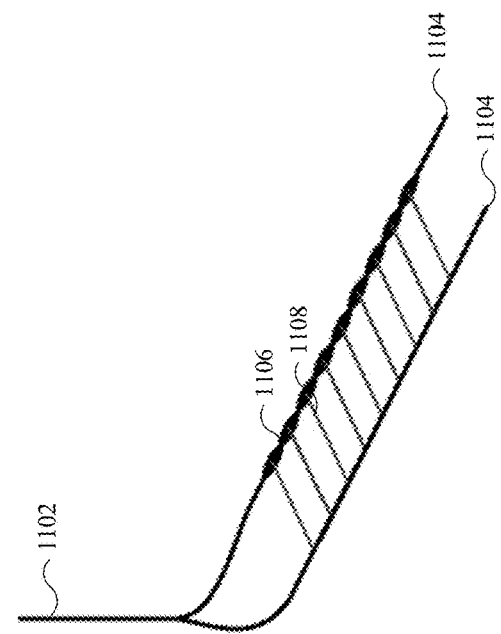
FIGS. 11A-11C illustrate various stages of an exemplary "radiator" well, according to various embodiments.
Figure 11B:
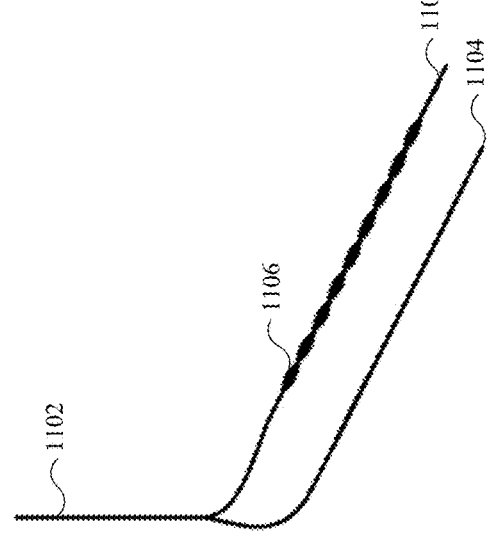
Figure 11A:
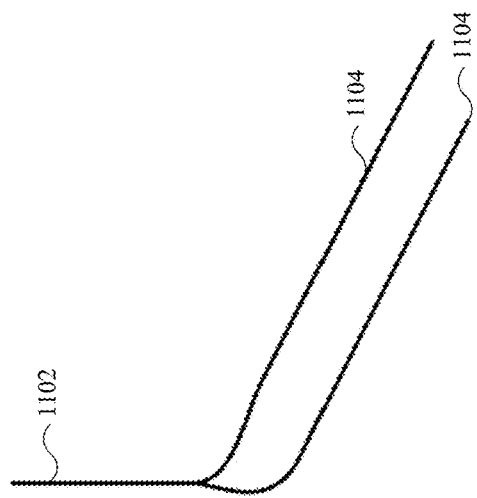

FIG. 11 illustrates various stages of an exemplary "radiator" well. In FIG. 11A, a vertical borehole 1102 can be drilled down to a target location (e.g., a target depth). The target location can be determined by geological surveys which indicate sufficient potential for sufficient heating to make geothermal energy production economically realistic. The target location can depend on location of the drilling site, the formation(s) to be drilled, and other considerations.

At the target location (e.g., a target depth), multiple lateral boreholes 1104 can be drilled. The lateral boreholes 1104 can be parallel to each other as shown in FIG. 11A. Any number of lateral boreholes 1104 can be drilled from the vertical portion 1102 of the well and this disclosure is not limited to two parallel lateral boreholes 1104 as shown in FIG. 11A. In one embodiment, one of the lateral boreholes 1104 can be used as the injector well and the other one of the lateral boreholes 1104 can be used as the recovery well. In alternative embodiments, three lateral boreholes 1104 can be drilled. In the case of three lateral boreholes 1104, a center or middle lateral borehole can be used as the recovery well and the outer lateral boreholes can both be used as an injector well. The lateral boreholes 1104 can be connected at one end to the vertical borehole 1102.

FIG. 11B illustrates chambering out a plurality of chamber points 1106 in one of the lateral boreholes. While there are nine chamber points 1106 illustrated in FIG. 11B, any number of chamber points 1106 may be generated in one of the lateral boreholes 1104. The generating of the chambers allows for drilling a passageway (or rung) from one of the lateral boreholes 1104 to a second lateral borehole. The generating of chambers allows for exposing the maximum possible area of rock to the circuit of water from the injectors. The chambering process can make the target hole larger and easier to drill. Moreover, the chambers 1106 make it easier to drill or generate the fluid pathways connecting the lateral boreholes 1104.

The process for generating the chambers 1106 can be done by at least one or more of targeted jetting techniques, applying acid slugs, washing out the chamber point 1106, or drilling with asymmetric drill bits, or combinations thereof. In various embodiments, the target points can be chambered out until a diameter at the target points of 36 inches. The chambering process allows for errors in positioning the passageway (or rungs). For example, at 50-foot separation between the first lateral borehole and the second lateral borehole, the diameter at the target point can be 1.5 foot across. This can allow for +/−1.7 degrees in error when drilling the fluid passageway (or rung). The distance between the two or more lateral portions can be more or less than 50 feet, such as 25 feet, 75 feet, 100 feet, or more.

In various embodiments, the generating of chambers 1106 comprises generating chambers having at least a predetermined diameter or shape. In various embodiments, the chamber points 1106 can be chambered out to form a pea-pod shape.

Drilling techniques can provide very accurate measured depth accuracy. For example, techniques can allow for vertical depth accuracy on the order of 0.2% or approximately 2 feet per 1000 feet depth. So, if the target depth was 20,000 feet, it should be relatively achievable using temperature connection, stretch connections, and the drill pipe 144 to connect lines at the desired depths.

However, azimuthal accuracy can be more difficult to achieve. If the two lateral boreholes are 50 to 100 feet apart, and the azimuth was out by one degree, the accuracy may be off plus or minus two feet in azimuth. The longer the fluid passageway (or rung), the more accurate the azimuth needs to be to ensure the injection well is connected to the recovery well.

FIG. 11C illustrates a plurality of passageways 1108 (or rungs) that can drill between the plurality of lateral boreholes 1104. The passageways 1108 each provide fluid communication between one of the plurality of chambers in a first of the plurality of lateral boreholes 1104 and the second lateral borehole 1104.

Current techniques for drilling the passageway 1108 (or rung) can involve the use of coil tubing and going in through the primary well, carving into a lateral and water jetting using coil tubing. The use of coiled tubing can be a very expensive process. In addition, coil tubing can be very difficult to steer and control.

A propellant can be used to blast through the small drain holes and wash out the required diameter. For example, a first drill hole can have a half an inch diameter and after abrasive fluids go through the passageways 1108 the hole sizes can be increased. The passageways 1108 can be flushed with water after the desired diameter is achieved.

In various embodiments, one of the first lateral borehole and the second lateral borehole is located vertically above the other. In various embodiments, there is a 90-degree angle between the passageway and the various lateral boreholes. The 90-degree angle should reduce the cost in drilling and minimizes the potential for error. It should be noted that a 90-degree angle, however, is not required. The angle of the passageway from a first lateral borehole may be anywhere from about 10 degrees to about 85 degrees. Moreover, the various passageways may have the same or varying angles with respect to the lateral. In addition, the passageways need not be straight lines, but may be curved, serpentine, or other shapes if desired.

Figure 12C:
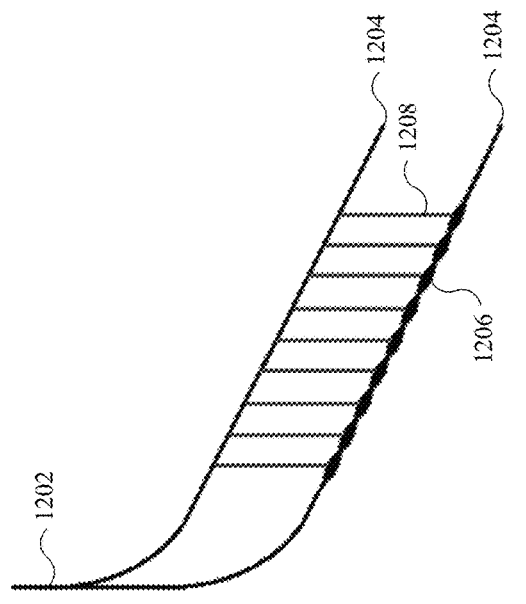
FIGS. 12A-12C illustrate various stages of a second exemplary "radiator" well, according to various embodiments.
Figure 12B:
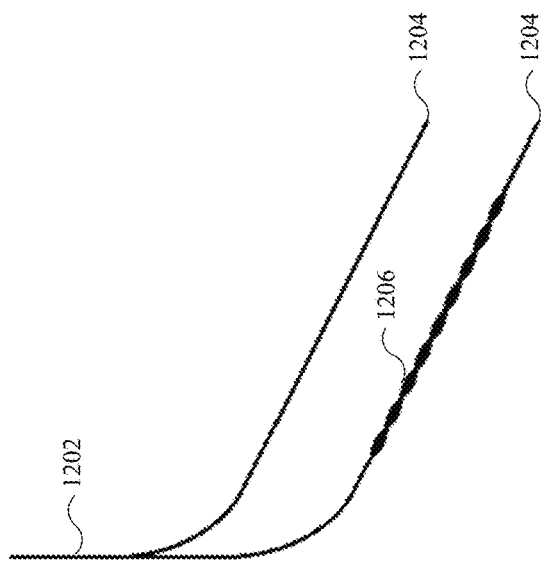
Figure 12A:
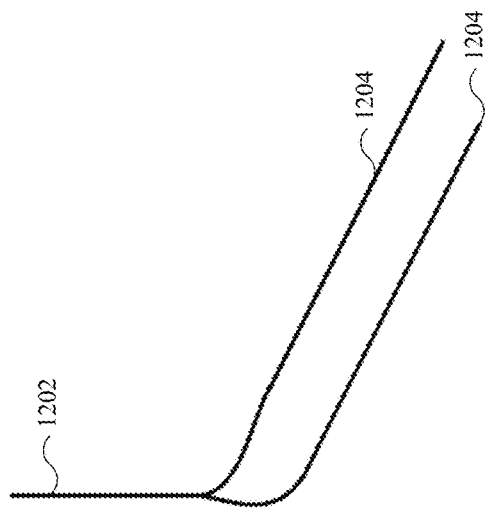

FIGS. 12A-12C illustrate various stages of a second exemplary "radiator" well. In FIG. 12A, a vertical borehole 1202 can be drilled down to a target location (e.g., a target depth or a location with a target temperature). The target location can be determined by geological surveys which indicate sufficient potential for sufficient heating to make geothermal energy production economically realistic. The target location can depend on location of the drilling site, the formation(s) to be drilled, and other considerations.

At the target location (e.g., a target depth), multiple lateral boreholes 1204 can be drilled from a single vertical borehole. The lateral boreholes 1204 can be parallel to each other as shown in FIG. 12A. Any number of lateral boreholes 1204 can be drilled from the vertical portion 1202 of the well and this disclosure is not limited to two parallel lateral boreholes 1204 as shown in FIG. 12A. In one embodiment, one of the lateral boreholes 1204 can be used as the injector well and the other one of the lateral boreholes 1204 can be used as the recovery well. In alternative embodiments, three lateral boreholes 1204 can be drilled. In the case of three lateral boreholes 1204, a center or middle lateral borehole can be used as the recovery well and the outer lateral boreholes can both be used as an injector well, or one of the outer lateral boreholes may be used as the recovery well. The lateral boreholes 1204 can be connected at one end to the vertical borehole 1202.

In various embodiments, two lateral boreholes can be drilled at the same target vertical depth or one above the other. The lateral boreholes can be separated a predetermined distance, which may be the same or may vary along the length of the two lateral boreholes. Drilling the two lateral boreholes in the same vertical plane should reduce the cost for drilling. In addition, the cutting head can be directed by gravity with no accelerometers and no azimuth worries when creating the connecting fluid passageways 1208. Various drilling features (e.g., vertical hold) can be used to drill the passageways 1208 of this embodiment. The lateral boreholes may, but need not be, horizontal, and may, but need not extend from the vertical borehole at an angle other than 90 degrees, which angle may (but need not) be anywhere from 10 degrees to 80 degrees with respect to the vertical portion of the vertical borehole.

FIG. 12B illustrates chambering out a plurality of chamber points 1206 in one of the lateral boreholes. While there are nine chamber points 1206 illustrated in FIG. 12B, any number of chamber points 1206 may be generated in one of the lateral boreholes 1204. The generating of the chambers allows for more easily creating a fluid passageway (or rung) from one of the lateral boreholes 1204 to a second lateral borehole. The generating of chambers allows for exposing the maximum possible area of rock to the circuit of water from the injectors. The chambering process can make the target hole larger and easier to create. Moreover, the chambers 1206 make it easier to drill or generate the fluid pathways connecting the lateral boreholes 1204.

The process for generating the chambers 1206 can be done by at least one or more of targeted jetting techniques, applying acid slugs, washing out the chamber point 1206, or drilling with asymmetric drill bits, or combinations thereof. In various embodiments, the target points can be chambered out until a diameter at the target points of 36 inches. The chambering process allows for errors in positioning the passageway (or rungs). For example, at 50-foot separation between the first lateral borehole and the second lateral borehole, the diameter at the target point can be 1.5 foot across. This can allow for +/−1.7 degrees in error when drilling the fluid passageway (or rung). The distance between the two or more lateral portions can be more or less than 50 feet, such as 25 feet, 75 feet, 100 feet, 200 feet, 300 feet, 500 feet, or more.

In various embodiments, the generating of chambers 1206 comprises generating chambers having at least a predetermined diameter or shape. In various embodiments, the chamber points 1206 can be chambered out to form a pea-pod shape.

Drilling techniques can provide very accurate measured depth accuracy. For example, techniques can allow for vertical depth accuracy on the order of 0.2% or approximately 2 feet per 1000 feet depth. So, if the target depth was 20,000 feet, it should be relatively achievable using temperature connection, stretch connections, and the drill pipe 144 to connect lines at the desired depths.

However, azimuthal accuracy can be more difficult to achieve. If the two lateral boreholes are 50 to 100 feet apart, for example, and the azimuth was out by one degree, the accuracy may be off plus or minus two feet in azimuth. The longer the fluid passageway (or rung), the more accurate the azimuth needs to be to ensure the injection well is connected to the recovery well.

FIG. 12C illustrates a plurality of passageways 1208 (or rungs) that can drill between the plurality of lateral boreholes 1204. The passageways 1208 each provide fluid communication between one of the plurality of chambers in a first of the plurality of lateral boreholes 1204 and the second lateral borehole 1204. By providing a number of fluid pathways between the lateral boreholes 1204, the combination of boreholes and pathways provides a greater amount of surface area by which the heating fluid (e.g., water or brine), is exposed to the heated target location without the need for drilling even more lateral boreholes 1204 or vertical boreholes.

Techniques for creating the passageways 1208 (or rungs) can involve the use of coil tubing and going in through the primary well, carving into a lateral and water jetting using coil tubing. The use of coiled tubing can be a very expensive process. In addition, coil tubing can be very difficult to steer and control.

A propellant can be used to blast through the small drain holes and wash out the required diameter. For example, a first drill hole can have a half an inch diameter and after abrasive fluids go through the passageways 1208 the hole sizes can be increased. The passageways 1208 can be flushed with water after the desired diameter is achieved.

In various embodiments, one of the first lateral borehole and the second lateral borehole is located vertically above the other. In various embodiments, there is an approximately 90-degree angle between each passageway and the various lateral boreholes. This 90-degree angle should reduce the cost in drilling and minimizes the potential for error. It should be noted that a 90-degree angle, however, is not required. If the passageway extends from the lateral borehole at an angle other than 90 degrees, there will be an acute angle and an obtuse angle defined between the passageway's longitudinal centerline and the centerline of the lateral borehole. The acute angle of the passageway extending from a first lateral borehole may be anywhere from 0 degrees to about 90 degrees, and more particularly from about 5 degrees to 85 degrees, 30 degrees to 60 degrees, or about 45 degrees. Moreover, the various passageways may have the same or varying angles with respect to the lateral borehole. In addition, the passageways need not be straight lines, but may be curved, serpentine, or other shapes if desired.

Although it is expected that a passageway drilled from an existing lateral borehole 1204 will be most economically efficient, a series of boreholes drilled perpendicular to the lateral boreholes from multiple surface locations or from a single vertical borehole could also be used. The lateral boreholes 1204, for example, could be drilled in a manner that is not straight but instead weave together to create the passageways could be employed.

Figure 13:
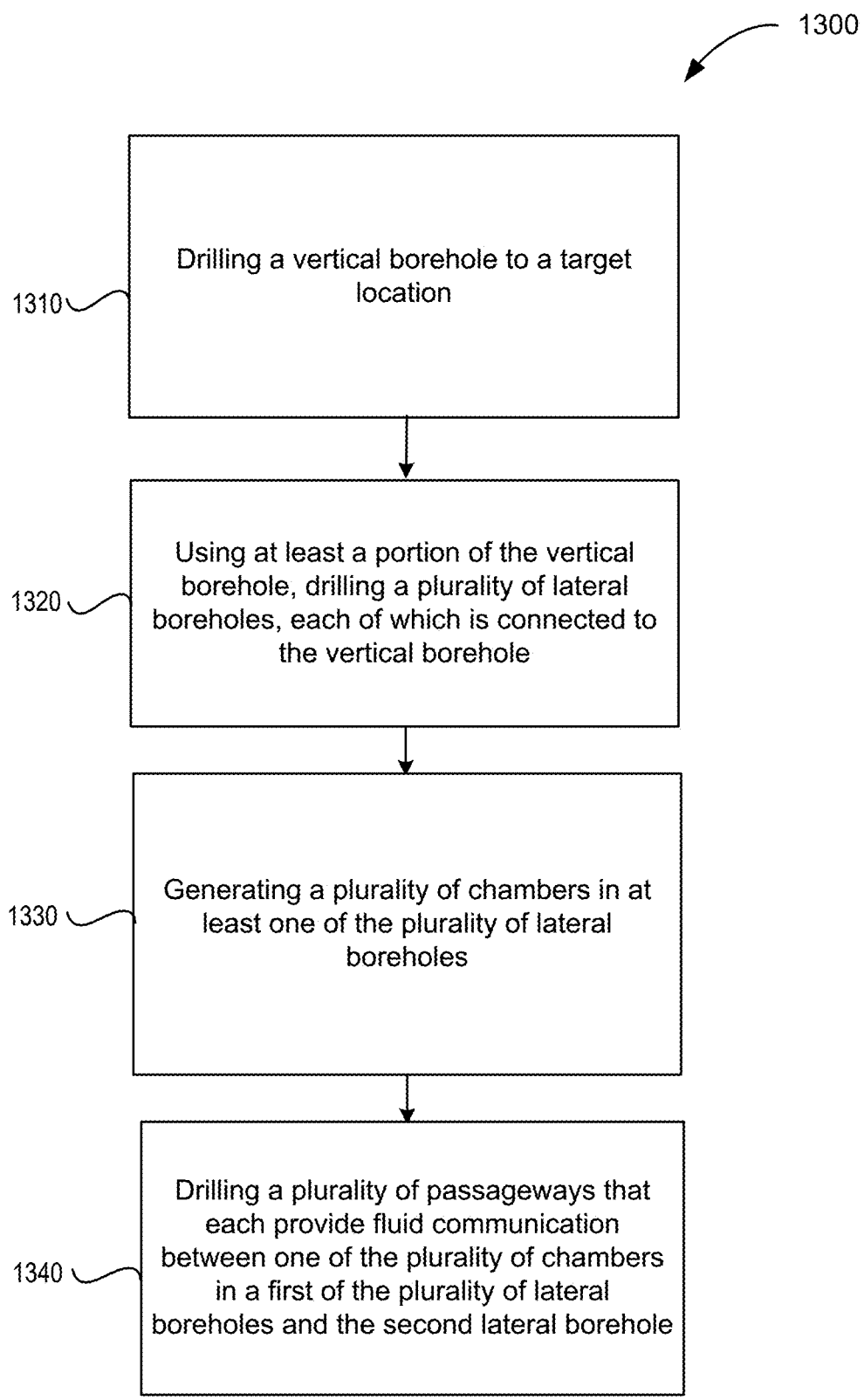
FIG. 13 illustrates a flowchart of an example process for drilling a geothermal "radiator" well according to an embodiment of the disclosure, according to various embodiments.

FIG. 13 illustrates a flowchart of an example process 1300 for drilling a geothermal radiator well according to an embodiment of the disclosure. In some implementations, one or more of the process blocks of FIG. 13 may be performed by the controller 1000. In some implementations, one or more process blocks of FIG. 13 may be performed by another device, or a group of devices separate from or including the controller 1000. Additionally, or alternatively, one or more process blocks of FIG. 13 may be performed by one or more components of the controller 1000, such as processor 1001, memory/media 1010, input device 1008, output device 1009, computer instructions 1024, a display 1005, and a bus 1002.

At block 1310, the process 1300 can include drilling a vertical borehole to a target location. The target location can be a target depth. The target depth can be determined from a geological survey based on proximity to one or more heat source locations.

At block 1320, the process 1300 can include using at least a portion of the vertical borehole, drilling a plurality of lateral boreholes from the same vertical borehole section. Each of the plurality of lateral borehole can be connected to the vertical borehole. In various embodiments, the lateral boreholes can be drilled using directional drilling techniques. In various embodiments, the lateral boreholes can be parallel. In various embodiments, one lateral borehole can be vertically located above or below the other lateral borehole. In some embodiments additional lateral boreholes can be drilled from the vertical section, and/or a plurality of vertical and lateral boreholes may be connected at or near the surface 104.

At block 1330, the process 1300 can include generating a plurality of chambers in at least one of the plurality of lateral boreholes. In various embodiments, propellant can be used to generate the plurality of chambers. The chambers can be peapod shaped. In various embodiments, the chambers can be generated with a predetermined diameter, which may be 12, 24, 36, or 48 inches, or some other size.

At block 1340, the process 1300 can include drilling a plurality of passageways that each provide fluid communication between one of the plurality of chambers in a first of the plurality of lateral boreholes and the second lateral borehole. In various embodiments, directional drilling techniques can be used to drill the plurality of passageways. The passageway can allow the flow of a fluid (e.g., water, brine, steam, or a combination thereof) from the injection borehole to the recovery borehole. The passageways allow for maximum exposure of fluid to the heat source.

It will be appreciated that process 1300 is illustrative, and variations and modifications are possible. Steps described as sequential may be executed in parallel, order of steps may be varied, and steps may be modified, combined, added, or omitted. As noted, a controller 1000 or computer system (e.g., steering control system 168) may be used to control the steps of the processes described herein.

Figure 14:
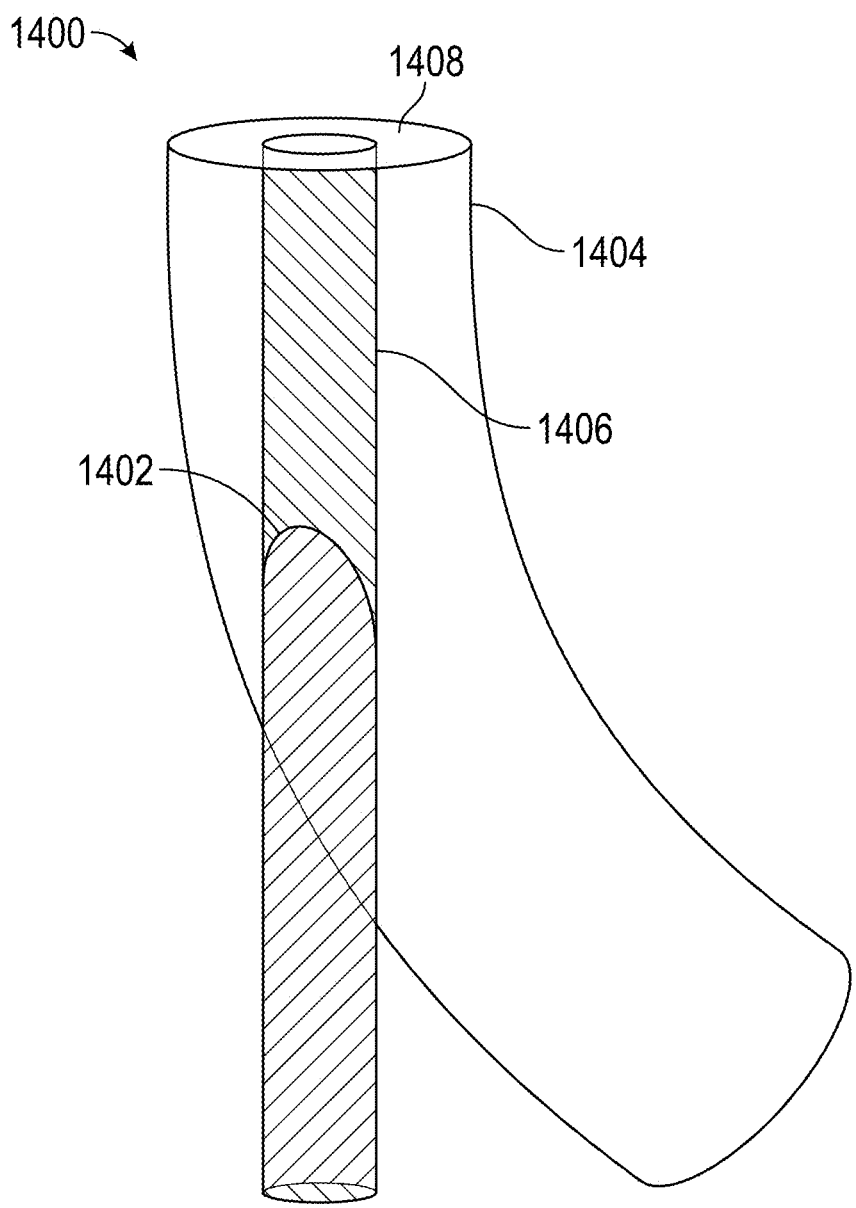
FIG. 14 illustrates an exemplary connector for connecting the injection borehole and recovery borehole to a single vertical well, according to various embodiments.

FIG. 14 illustrates an exemplary circuit connector 1400 for connecting the injection borehole and recovery borehole to a single vertical well. The circuit connector 1400 can be constructed by drilling a first gauge hole in the vertical borehole at a first location of the first parallel lateral well. Next, the curve in one of the lateral boreholes can be cased at the first location. The casing can be further milled for a second gauge hole 1402. The second gauge hole 1402 can be a small gauge sidetrack. A pipe 1406 can be placed in the second gauge hole to form an annulus 1408 between an inside of the first gauge hole 1404 and an outside of the pipe 1406. In various embodiments, a heated fluid (e.g., hot water or steam) can flow up the annulus 1408. In various embodiments, injection fluid (e.g., water) can flow through the pipe 1406 into the injection borehole.

Figure 15:
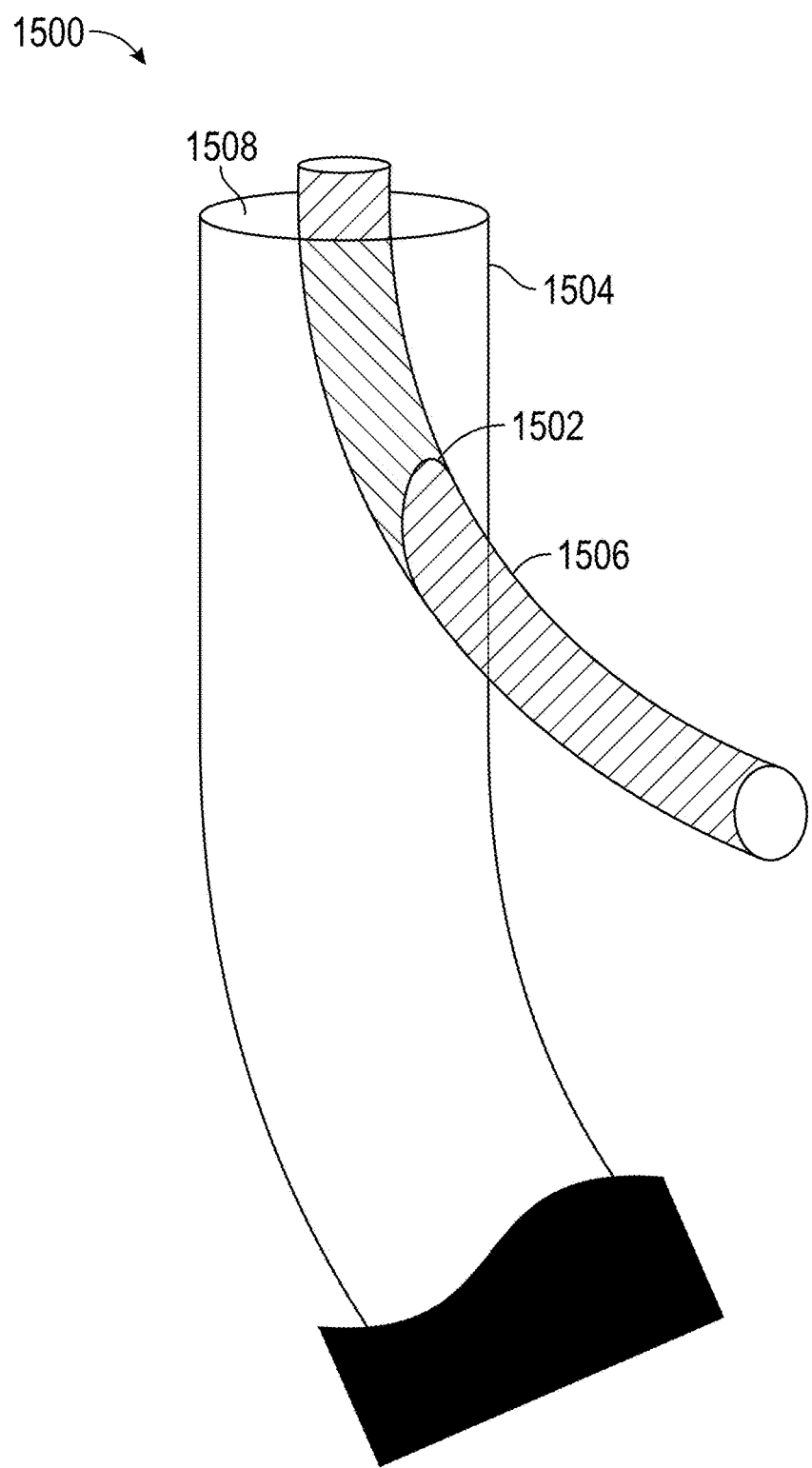
FIG. 15 illustrates a second exemplary connector for connecting the injection borehole and recovery borehole to a single vertical well, according to various embodiments.

FIG. 15 illustrates an exemplary circuit connector 1500 for connecting the injection borehole and recovery borehole to a single vertical well. The circuit connector 1500 can be constructed by drilling a first gauge hole in the vertical borehole at a first location of the first parallel lateral well. Next, the curve in one of the lateral boreholes can be cased at the first location. The casing can be further milled for a second gauge hole 1502. The second gauge hole 1502 can be a small gauge sidetrack. A pipe 1506 can be placed in the second gauge hole to form an annulus 1508 between an inside of the first gauge hole 1504 and an outside of the pipe 1506. In various embodiments, a heated fluid (e.g., hot water, brine, and/or steam) can flow up the annulus 1508. In various embodiments, injection fluid (e.g., water, brine, etc.) can flow through the pipe 1506 into the injection borehole.

In various embodiments, the vertical borehole and the first lateral borehole can be reinforced well beyond the curve.

Figure 16:
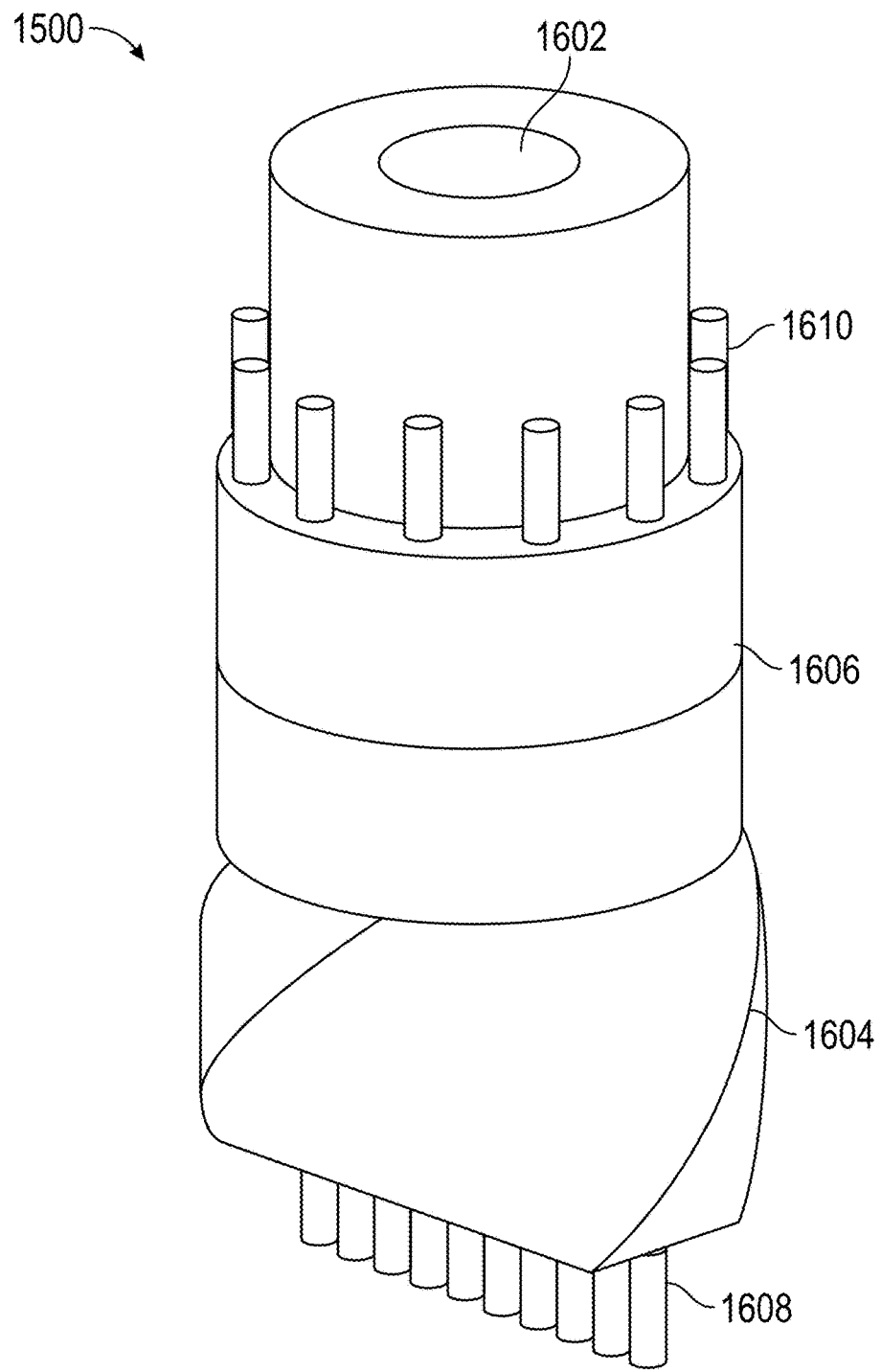
FIG. 16 illustrates an apparatus for drilling the passageways of a geothermal well, according to various embodiments.

FIG. 16 illustrates an apparatus 1600 for drilling the passageways of a geothermal well. In an aspect, the apparatus 1600 can include a propellant feed line 1602 coupled to a proximate end of rotating head 1604 via a bearing assembly 1606. The rotating head 1604 can include one or more cutting nozzles 1608 affixed to a distal end of the rotating head 1604. One or more thrust nozzles 1610 can be coupled to a proximate end of the bearing assembly 1606. One or more interior passageways can connect the propellant feed line 1602 to the one or more thrust nozzles 1610. In various embodiments, the rotating head 1604 can be helix shaped so as to naturally cause it to rotate without having to generate a power source to rotate the head.

Figure 17:
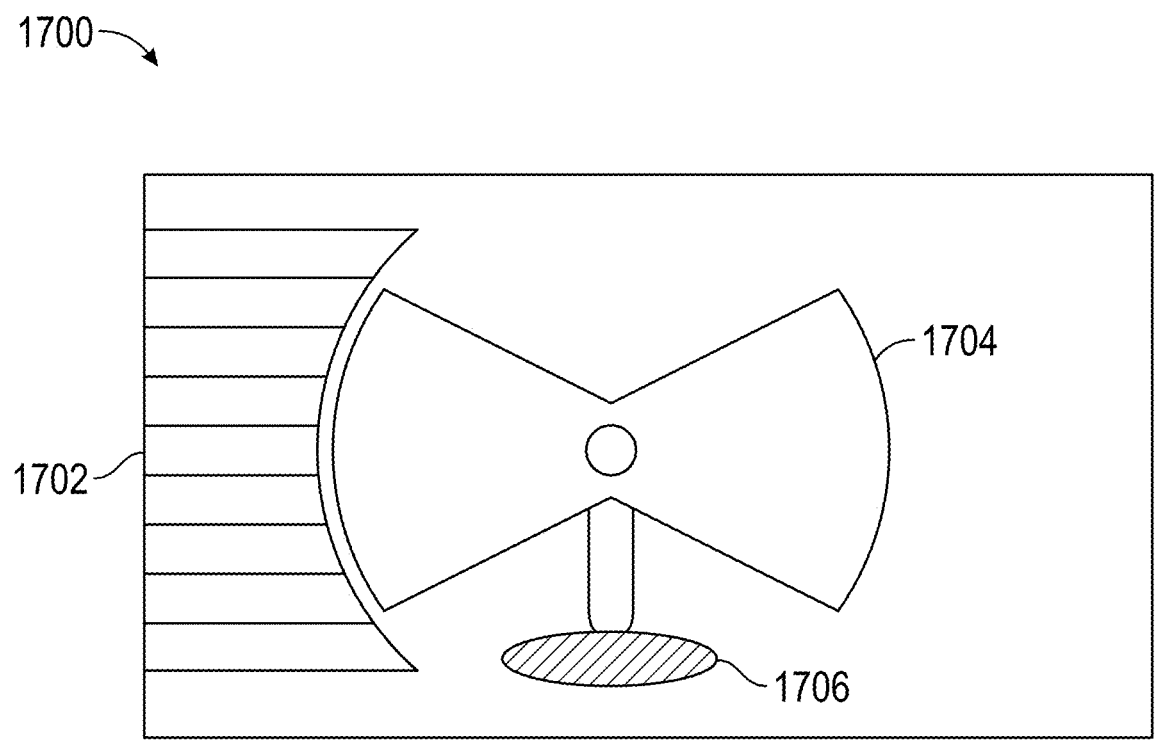
FIG. 17 illustrates various elements of an apparatus for drilling the passageways of a geothermal well, according to various embodiments.

FIG. 17 illustrates various elements of an apparatus 1700 for drilling the passageways of a geothermal well. In various embodiments, the apparatus 1700 can include a gravity sensor to detect an orientation of the apparatus and direct jetting of propellant.

In various embodiments, the apparatus 1700 can include one or more nozzle feeds 1702 for the one or more cutting nozzles 1608 of FIG. 16. The apparatus 1700 can include a pendulum block 1704 to direct a flow of propellant from a propellant chamber 1706 of the apparatus 1700 to the one or more nozzle feeds 1702.

In some oil and gas drilling activities such as SAGD, Steam-Assisted Gravity Drainage, drilling, spacing is of paramount importance. SAGD techniques can be used to drill the injection and recovery wells in close proximity to each other. Similar to the examples given above, the surface steerable system can be leveraged to maintain spacing more accurately as well as account for variations of production value and collision risk with adjacent wells. Spacing is of paramount importance with SAGD wells and it is common to ignore survey special referencing and steer a well purely on magnetic ranging as illustrated in FIG. 18. In this process, a first well 1804 is drilled and the well bore cased with a ferrous casing. The second well 1806 can be either the production or the steam or heated injection well. Spacing of the second well 1806 relative to the first well 1804 can be managed by the surface steerable system by applying a cost curve to identify the driving cost factor or rules to maintain spacing close to the initial well but not so close to risk collision. This can be accomplished using dimensional referencing using sensor information from magnetic sensor 1802. This can also be accomplished by referencing magnetic intensity ranges provided by downhole sensors caused by the Earth's magnetic field 1808. By establish value curves relative to magnetic intensity ranges the surface steerable system can evaluate convergence plans as being more or less valuable or preferable as a whole or on a foot-by-foot basis. In this way, the steering decision becomes automated to maintain proper spacing over a well utilizing the surface steerable system.

For purposes of evaluating future cost/value impact due to spacing variation to the cased hole 1804 in a SAGD application, a geometric reference to anchor the cost curve may be established in 3D space. To forecast the future ideal spacing path (FIG. 17), it is necessary to project relative closure and divergence tendencies based on recent trajectories of the current well 1806 and the survey trajectories of the pre-existing well hole or well holes 1804 at step 1902. For example, if the most recent survey and/or bit projection for the currently being drilled hole is at 92 degrees inclination and the survey for the pre-existing well is at 90 degrees, the surface steerable system can forecast that the wells will be diverging in the vertical plane. The same can be done with azimuthal trajectory or by referencing 3D trajectory as a common spacing vector.

Using the most recent mag ranged distance between the active and the previous wells, a position of the sensors relative to the ideal distance or spacing can be established at step 1904. With this spacing reference and the historical trajectory reference, a parallel, ideally spaced target line can be forecast at step 1906 relative to the existing cased whole surveys. The length of forecasting can be programmable from relatively short lengths to full extension to the end of the well, as needed. The intent is to provide a geometric path longer than the convergence plan solutions so that the relative position cost curves can be anchored to a position in relative space, and the foot-by-foot value driven by the relative spacing cost curves can be calculated for a wide variety of convergence plans to establish the optimal path.

If data is available from drilling the previously cased hole 1804, the surface steerable system has the ability to rerun the data to develop at step 1908 a borehole estimation of the actual borehole path rather than being constrained to the minimum curvature path defined by historical surveys. This provides a higher resolution path to develop the parallel path used for future ideal mag ranging and spacing.

There can be multiple or single cost curves for mag ranging. One for left right spacing and one for up down spacing is one approach that allows for a variation of TVD and azimuthal correction and spacing, but in some cases, a pure 3D closest distance similar to anti-collision calculations can be used. In both two dimensional and three-dimensional spacing applications, an ideal spacing position is used to reference or anchor the curve.

All relative spacing cost curves can be used in conjunction with or instead of other well plan anchored cost curves or trajectory cost curves. Relative spacing cost curves, as with all other cost curves, can be asymmetrical in nature. In a SAGD well, it might be preferable to ere on the side of being further away from the adjacent borehole than to get dangerously close to colliding with the previous drilled borehole, and thus, the cost curves can bias the selection of plans that are close to the ideal location but have a higher probability of being further away than being too close.

As with other drilling with the surface steerable system, the projections and plans considered take into account the rotary build and drift tendencies of the borehole being drilled when forecasting future convergence plan options.

Figure 25C:
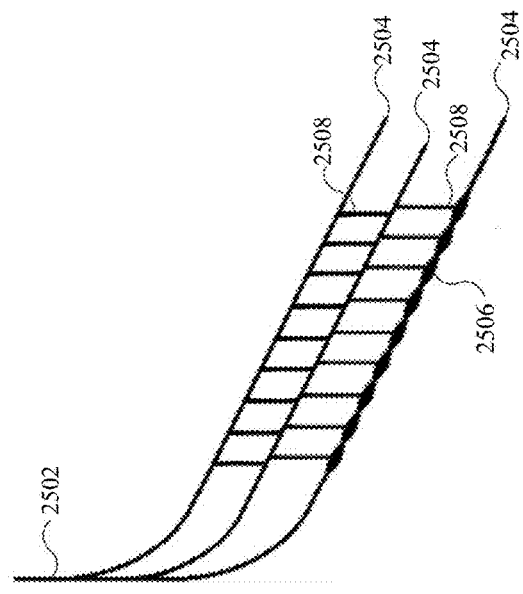
FIGS. 25A-25C illustrate various stages of a third exemplary "radiator" well, according to various embodiments.
Figure 25B:
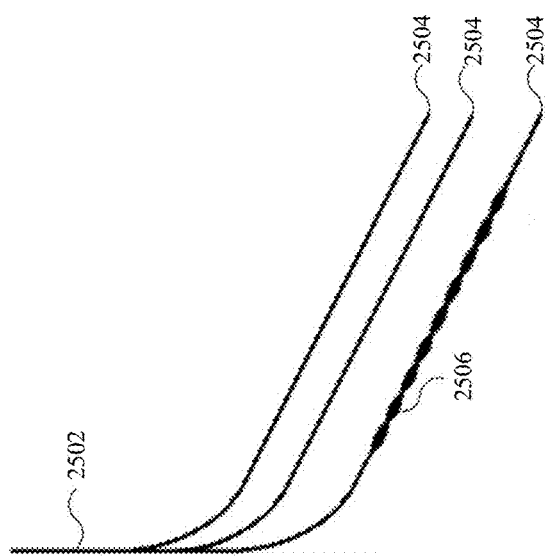
Figure 25A:
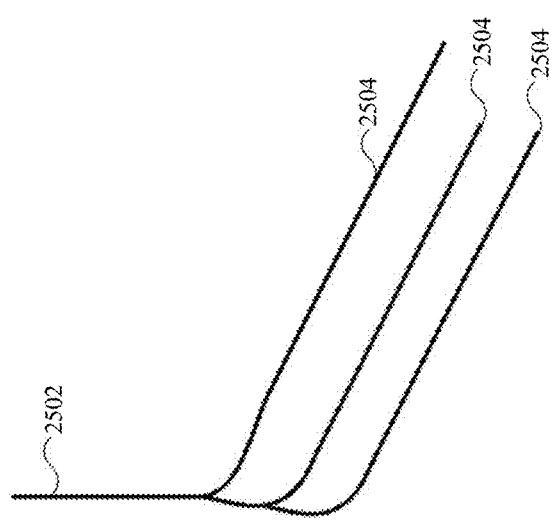

It should be noted that the techniques described above that may be useful for SAGD applications may be of use in connection with efforts to place one lateral borehole close to another lateral borehole, including when one is located vertically above or below the other. It should be further appreciated that multiple lateral boreholes may be drilled one above the other in a substantially vertical plane. For example, as illustrated in FIGS. 25A-25C, one vertical borehole 2502 could be used to drill several offset lateral boreholes 2504, each lateral borehole 2504 at a different depth and two lateral boreholes 2504 located a desired distance or range below the third lateral borehole 2504. Moreover, the spacing of the lateral boreholes 2504 would not necessarily need to be uniform, especially if the porosity or permeability of the rock layers differs, among other things. In such a three-lateral borehole configuration, the top two lateral boreholes 2504 could be used to receive the heat fluid (e.g., water, brine, or the like), with the third and bottom lateral borehole 2504 serving as the receiving borehole by which the heated fluid (e.g., heated water, brine, steam, or a combination thereof) is returned to the surface 104 for use to generate electricity or otherwise provide heat. It should be further noted that the lateral boreholes 2504 may but need not be of the same diameter and may be of different diameters. FIG. 25B illustrates chambering out a plurality of chamber points 2506 in one of the lateral boreholes 2504. As previously disclosed, while there are nine chamber points 2506 illustrated in FIG. 25B, any number of chamber points 2506 may be generated in one of the lateral boreholes 2504. FIG. 25C illustrates a plurality of passageways 2508 (or rungs) that can drill between the plurality of lateral boreholes 2504. The passageways 2508 each provide fluid communication between one of the plurality of chambers 2506 in a first of the plurality of lateral boreholes 2504 and the second lateral borehole 2504 and/or the third lateral borehole 2504. By providing a number of fluid pathways between the lateral boreholes 2504, the combination of boreholes 2504 and passageways 2508 provides a greater amount of surface area by which the heating fluid (e.g., water or brine), is exposed to the heated target location without the need for drilling even more lateral boreholes 2504 or vertical boreholes 2502.

In addition to the systems and methods described above for drilling a borehole in a particular location, which may be relative to a formation, heat zone, one or more other, previously drilled boreholes, or combinations thereof, we believe that additional systems and methods may be useful for drilling one or more boreholes for a geothermal well as described herein. In one embodiment, a guiding device may be used to help guide and direct the drill bit 148 drilling a borehole towards a heat source. For example, a device such as a bottom hole assembly may include one or more portions or components that comprise one or more thermomechanical actuators. Such thermomechanical actuators may comprise thermal expansion portions or components that respond to a heat source and/or a heat differential and direct the drill bit 148 towards the heat source. In one such approach, the drill string 146 and/or BHA 149 may include one or more portions or components that comprise amplified metal thermal expansion materials, such as bimetallic thermal actuators, pseudo bimorph thermal actuators, and/or may use geometric constraints to obtain the desired actuation towards a heat source. In one such an embodiment, the BHA 149 or drill string components or portions that are heated more (e.g., are closer to a geothermal heat source) expand at a first rate responsive to their material's first thermal coefficient and due to the exposure to the heat, while other components or portions made from a second material with a different thermal coefficient expand at a different rate. The different expansion rates of the two materials of the components or portions thus can be used to direct or steer the drill bit 148 towards the geothermal heat source. Such systems and methods may be used in addition to any or all of the sensors, control systems, and techniques described above for directional drilling of a borehole.

Figures 20, 21:
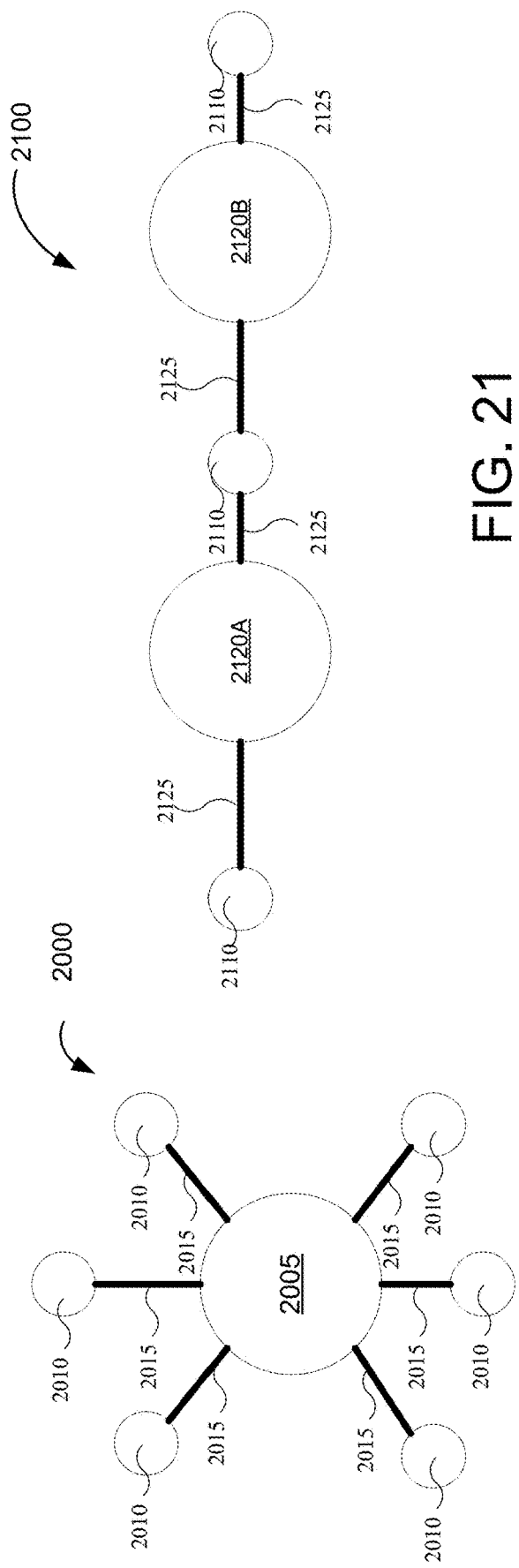
FIG. 20 illustrates an example borehole configurations for a geothermal well, according to various embodiments.
FIG. 21 illustrates a second potential borehole configuration for a geothermal well, according to various embodiments.

Referring now to FIGS. 20 and 21, additional examples of possible configurations of a "radiator" well in accordance with this disclosure are provided. In FIG. 20, a central borehole 2005 is shown. Located around and proximal to the central borehole 2005 are six peripheral boreholes 2010, each of which is connected to the central borehole 2005 by a fluid pathway 2015. As noted above, the boreholes may, but need not, be the same size or may be different sizes. Similarly, the distances between the central borehole 2005 and each of the peripheral boreholes 2010 may be the same or may differ. In FIG. 20, boreholes 2005 and 2010 may be lateral boreholes, each extending from a single vertical well section, or may be connected to a plurality of vertical well boreholes. In FIG. 21, an alternative arrangement of a plurality of lateral boreholes in accordance with this disclosure is shown. In FIG. 21, there are two primary boreholes 2120A and 2120B, and three secondary boreholes 2110, with the five boreholes shown as substantially aligned in a horizontal plane. Each of the secondary boreholes 2110 is connected to at least one of the two primary boreholes 2120A and 2120B by fluid pathways 2125. As previously noted, although the boreholes shown in FIG. 21 are of different sizes, they can, but need not, have the same size. Similarly, the spacing between and among the boreholes may be the same or may vary.

Figure 22:
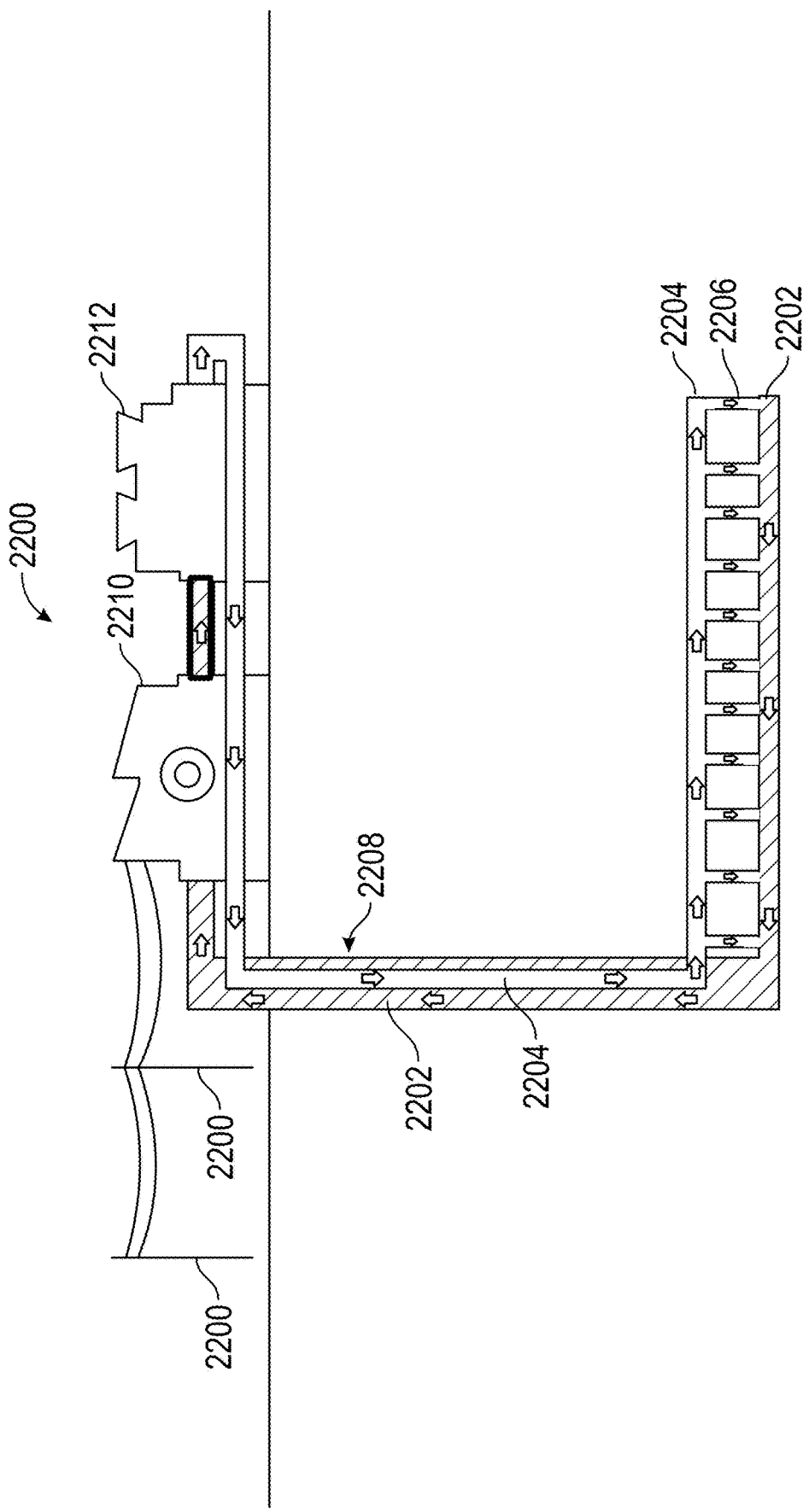
FIG. 22 illustrates an exemplary geothermal facility, according to various embodiments.

FIG. 22 illustrates a geothermal energy generator facility 2200. The facility 2200 can include a first borehole 2202, a portion of which is located proximal a geothermal heat source. The facility 2200 can include a second borehole 2204. At least a portion of the second borehole 2204 can be proximal and in fluid communication with the first borehole 2202 though a plurality of fluid pathways 2206 extending between the first borehole 2202 and the second borehole 2204. A fluid can be provided from a surface location to the first borehole 2202, flow through the first borehole 2202 and through the plurality of fluid pathways 2206, and return to the surface location as steam, heated liquid, or a combination thereof through the second borehole 2204. The facility 2200 can include a cooling system 2212. The cooling system 2212 can include one or more cooling towers. A cooling tower can be an integrated part of any geothermal power plant because waste heat from turbine exhaust steam must be continuously rejected to make the plants operate. According to the heat dump choice, the cooling system can be classified as wet cooling or dry cooling. Dry cooling towers conduct heat transfer through air-cooled heat exchanger that separates the working fluid from the cooling air. In a dry cooling tower, air can be introduced by either mechanical draft fans or by natural draft tall tower to move the air across the air-cooled heat exchangers.

In various embodiments, a generator 2210 at the surface location adapted to receive the steam, liquid, or combination thereof and generate electricity therefrom, which can be supplied by the facility to a power grid.

In various embodiments, the first borehole 2202 and the second borehole 2204 are in fluid communication with a vertical borehole 2208.

In various embodiments, at least a portion of the second borehole 2204 is located under a portion of the first borehole 2202.

In various embodiments, a flow divider located in the vertical borehole 2208 divides an input flow and an output flow in the vertical borehole 2208.

In various embodiments, the vertical borehole 2208 comprises a first portion adapted to receive an input flow of a liquid to at least one of the first borehole 2202 and the second borehole 2204. A second portion can be adapted to receive an output flow of the liquid from the other of the first borehole 2202 and the second borehole 2204.

In various embodiments the geothermal facility 2200 can include a control system. The control system can be located at the facility 2200 or remote from the facility. The control system can be in communication with various sensors (e.g., temperature sensors, pressure sensors, seismic sensors (seismometers) and vibration sensors (seismoscope)). The one or more sensors can send data via wired or wireless means to the control system. The control system can monitor and control injection flow, steam/water output, fluid flow rates, turbine speed, turbine power output and power demand. The control system can determine if one or more conditions exist based on the sensor data to trigger a response by the control system. In various embodiments, the response may be automated. For example, if seismic sensors detect an earthquake above a predetermined threshold and/or a predetermined frequency, the control system can execute one or more actions (e.g., possibly shutdown) for the geothermal facility 2200.

In various embodiments, a regional system can include one or more geothermal facilities 2200. In various embodiments, each geothermal facility 2200 in the regional system can include separate turbines, cooling systems but share one or more control systems. In various embodiments of a regional system, one or more of the components of a geothermal facility 2200 (e.g., generators, cooling systems) may be shared between the various geothermal facilities. In addition, the one or more facilities 2200 may be connected to a power grid and/or to one or more energy using machines, equipment, or facilities. For example, the geothermal facility may be connected to and a part of a MicroGrid system such as described in U.S. Provisional Patent Application No. 63/112,083, U.S. Provisional Patent Application No. 63/114,336, and U.S. Patent Provisional Application No. 63/191,809, each of which is hereby incorporated by reference as if fully set forth herein.

FIG. 23A illustrates a first stage for a geothermal well design. In the first stage, a first borehole 2402 can be drilled having a large diameter. The first borehole 2402 can be drilled to just below a heat zone. The borehole can be conventionally cased. After the borehole is cased, a smaller second diameter borehole 2404 can be drilled to the deepest practical depth in the heat zone (or hydrothermal resource).

When the temperature of a hydrothermal resource is around 220 Fahrenheit and up, it can be used to generate electricity. Most electricity-producing geothermal resources have temperatures from 300 to 700 degrees Fahrenheit, but geothermal reservoirs can reach nearly 1,000 degrees Fahrenheit.

Hot water geothermal reservoirs can be used for the generation of electricity. In a liquid-dominated reservoir, the hot water has not vaporized into steam because the reservoir is saturated with water and is under pressure. To generate electricity, the hot water is piped from geothermal wells to one or more separators where the pressure is lowered and the water flashes into steam. The steam then propels a turbine generator to produce electricity. The steam can be cooled and condensed and either used in the plant's cooling system or injected back into the geothermal reservoir.

A binary cycle power plant is used when the water in a hot water reservoir is not hot enough to flash into steam. Instead, the lower-temperature hot water is used to heat a fluid that expands when warmed. The turbine is powered from the expanded, pressurized fluid. Afterwards, the fluid is cooled and recycled to be heated over and over again.

FIG. 23B illustrates a second stage for the geothermal well design. In the second stage, the second diameter borehole 2304 can be sidetracked below the casing in a fixed direction (e.g., North). A first sidetrack well 2308 can be built to a fixed inclination angle 2306 with a practical dogleg severity. The fixed inclination angle 2306 can be held to almost a half-way point 2310 to the TVD 2312 of the second diameter borehole 2304 such that there is enough depth before the half-way point 2310 to allow a return to vertical.

For example, if the build rate was 3 degrees per 100 feet with a maximum angle of 30 degrees, the equivalent radius can be approximately 1910 feet and the build section can use up to 955 feet of TVD. That is the same TVD needed to return to vertical before the half-way point 2310. After returning to vertical, it can be built in the opposite direction to the same maximum angle and start returning to vertical in time to arrive just before the terminal depth (e.g., TVD 2312).

This exemplary geothermal design can have several advantages. First, the well path uncertainty when returning to the same x, y position can be minimized by the fact that any systematic azimuth errors can be cancelled out on the return leg.

Second, access can be available to the second diameter borehole 2304 well such that a high accuracy magnetic ranging technique can be deployed (e.g., WellSpot, Rotating Magnetic System (RMS), or Seismic While Drilling (SWD) system can be used to guide the return to the second diameter hole 2304 from the sidetrack well 2308 easily).

Third, the directional drilling can be reduced to a single curvature at all curves in the profile and the straight sections can be long thereby reducing the complexity and the cost of the drilling.

Fourth, the drop to vertical at the end means the nudge to intersect only requires the toolface to be set correctly and the consequent azimuth to the intersection point can be achieved immediately.

FIG. 23C illustrates a third stage of the geothermal well design. In this stage, a second sidetrack well 2314 can be drilled in a different direction from the first sidetrack well. In FIG. 23, the second sidetrack well can be opposite the first sidetrack well 2308, but this is merely exemplary. In various embodiments, each sidetrack well can be started at a different total vertical depth to ease the steering of the kick-off portion of the sidetrack well. Therefore, the vertical depth of the second half-way point 2316 for the second sidetrack well 2314 may be at the same or a different depth of the half-way point 2310 for the first sidetrack well 2308.

FIG. 23C illustrates a fourth stage of the geothermal well design. In the stage additional sidetrack wells (e.g., a third sidetrack well 2318, a fourth sidetrack well 2320, a fifth sidetrack well 2322, and a sixth sidetrack well 2324) can be drilled in different directions of the first sidetrack well 2308 and second sidetrack well 2314. In various embodiments, each sidetrack well can be started at different total vertical depths to ease the steering of the kick-off portions of the sidetrack well.

Figure 24:
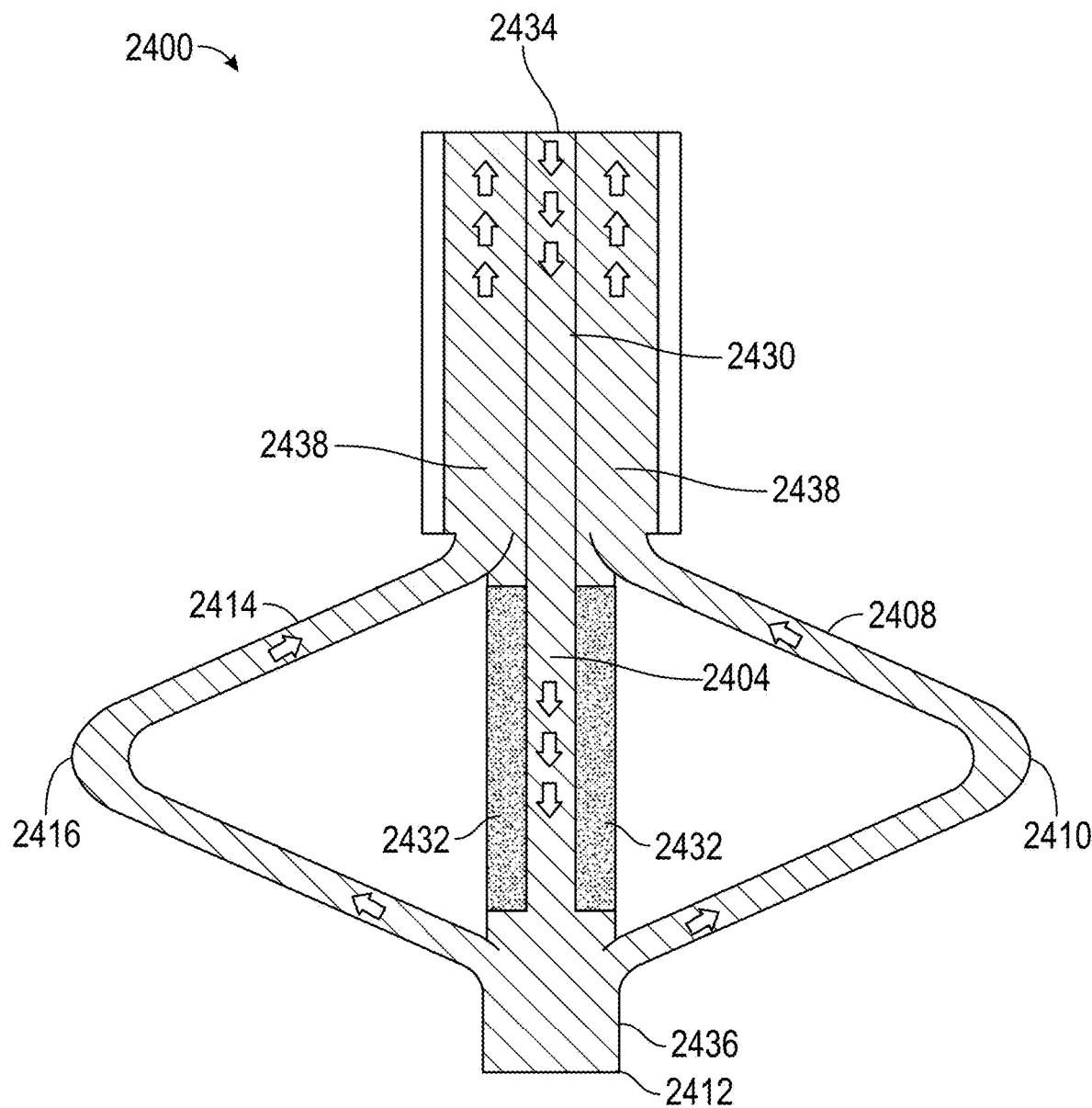
FIG. 24 illustrates an exemplary geothermal borehole configuration, according to various embodiments.

FIG. 24 illustrated an improved design for a geothermal well 2400.

After the sidetrack wells (e.g., first sidetrack well 2408 and second sidetrack well 2414) have been completed, a secondary casing 2430 can be hung in the second diameter hole 2404. The secondary casing 2430 can be cemented (e.g., using concrete 2432) in place below the sidetrack wells (e.g., first sidetrack well 2408 and second sidetrack well 2414). This can provide a circuit where water can be injected into a top portion 2434 of the secondary casing 2430 into the inner casing to terminal depth 2412. A bottom portion 2436 of the second diameter borehole 2404 can be widened to facilitate heat exchange in geothermal reservoir portion of the well. The heated water can return through the sidetrack wells (e.g., first sidetrack well 2408 and second sidetrack well 2414) to the annulus of the larger vertical well an exit the borehole to a power generation turbine.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents and shall not be restricted or limited by the foregoing detailed description.

What is claimed is:

1. A method for drilling a geothermal well, the method comprising:
   drilling a first portion of a first borehole to a geothermal target, wherein the first borehole defines a longitudinal axis, and the first portion has a first diameter;
   drilling a second portion of the first borehole below the first portion of the first borehole, wherein the second portion has a second diameter smaller than the first diameter;
   slide drilling a first end portion of a first portion of a second borehole, wherein the first portion of the second borehole curves downwardly and outwardly from the first borehole, wherein the first end portion of the first portion extends downwardly and outwardly from the longitudinal axis of the first borehole, and wherein the first portion of the second borehole is in fluid communication with the first borehole;
   slide drilling a second end portion of the first portion of the second borehole, the second end portion defining a curve, wherein the second end portion of the first portion extends downwardly;
   slide drilling a first end portion of a second portion of the second borehole, wherein the second end portion of the first portion of the second borehole and the first end portion of the second portion of the second borehole together form a curved portion of the second borehole, and wherein the second portion of the second borehole extends downwardly and towards the longitudinal axis of the first borehole;
   drilling a second end portion of the second portion of the second borehole, wherein the second end portion of the second portion extends into the first borehole, and wherein the second portion of the second borehole is in fluid communication with the first borehole; and
   casing at least a portion of the first borehole that is located below the first end portion of the first portion of the second borehole, wherein the casing has a third diameter smaller than the second diameter, and wherein the casing forms an annulus between the casing and the first borehole such that the casing defines a fluid pathway between the casing, the second borehole, and the annulus.

2. The method according to claim 1, further comprising:
   drilling a plurality of second boreholes, each having a first portion including a first end portion and a second end portion and a second portion including a first end portion and a second end portion, wherein each of the first end portions of the first portions of the plurality of second boreholes are connected to the first borehole at a first point, and each of the second end portions of the second portions of the plurality of second boreholes are connected to the first borehole at a second point, and wherein each first point is higher than each corresponding second point for each of the plurality of second boreholes.

3. The method according to claim 2, wherein the plurality of second boreholes comprise at least three boreholes.

4. The method according to claim 2, wherein the plurality of second boreholes are positioned around the longitudinal axis of the first borehole and radially spaced apart from one another by at least thirty degrees.

5. The method according to claim 1, wherein the fluid pathway through the casing is adapted to receive a fluid therethrough and the fluid pathway between the second borehole and the annulus is adapted to receive a fluid therethrough.

6. The method according to claim 1, wherein the first portion of the second borehole extends downwardly away from the first borehole at an angle of at least thirty degrees, and wherein the second portion of the second borehole extends downwardly towards the first borehole at an angle of at least thirty degrees.

7. The method according to claim 1, further comprising:
   casing one or more of the first end portion of the first portion of the second borehole, the second end portion of the first portion of the second borehole, the first end portion of the second portion of the second borehole, and the second end portion of the second portion of the second borehole.

8. The method according to claim 1, wherein the first portion of the second borehole is drilled to a first location a predetermined distance from a true vertical depth of the geothermal target, wherein the predetermined distance is less than half-way to the true vertical depth of the geothermal target, and wherein the second borehole has a fourth diameter smaller than the first diameter of the first borehole.

9. A geothermal well, comprising:
   a first borehole drilled to a geothermal target, the first borehole comprising a first portion and a second portion, wherein the first borehole defines a longitudinal axis, wherein the first portion has a first diameter, wherein the second portion has a second diameter smaller than the first diameter, and wherein the second portion is below the first portion;
   a second borehole comprising a first portion and a second portion,
      wherein a first end portion of the first portion of the second borehole is slide drilled to curve and outwardly from the first borehole, wherein the first portion of the second borehole extends downwardly and outwardly from the longitudinal axis of the first borehole, wherein the first portion of the second borehole is in fluid communication with the first borehole, wherein a second end portion of the first portion of the second borehole is slide drilled to define a curve, wherein the second end portion of the first portion extends downwardly, wherein a first end portion of the second portion of the second borehole is slide drilled to extend downwardly and towards the longitudinal axis of the first borehole, wherein the second end portion of the first portion of the second borehole and the first end portion of the second portion of the second borehole together form a curved portion of the second borehole, wherein the second end portion of the second borehole is slide drilled to curve downwardly and into the first borehole, and wherein the second portion of the second borehole is in fluid communication with the first borehole; and a casing positioned in at least a portion of the first borehole, wherein the casing is located below the first end portion of the first portion of the second borehole, wherein the casing has a third diameter smaller than the second diameter, wherein the casing forms an annulus between the casing and the first borehole such that the casing defines a fluid pathway between the casing, the second borehole, and the annulus, and wherein the fluid pathway allows flow of a fluid through the casing in a direction opposite to the flow of the fluid through the second borehole and the annulus.

10. The geothermal well according to claim 9, further comprising:

a plurality of second boreholes, each having a first portion including a first end portion and a second end portion and a second portion including a first end portion and a second end portion, wherein each of the first end portions of the first portions of the plurality of second boreholes are connected to the first borehole at a first point, and each of the second end portions of the second portions of the plurality of second boreholes are connected to the first borehole at a second point, wherein each first point is higher than each corresponding second point for each of the plurality of second boreholes, and wherein the plurality of second boreholes are positioned around the longitudinal axis of the first borehole and radially space apart from one another by at least thirty degrees.

11. The geothermal well according to claim 9, further comprising:

one or more second casings positioned in one or more of the first end portion of the first portion of the second borehole, the second end portion of the first portion of the second borehole, the first end portion of the second portion of the second borehole, and the second end portion of the second portion of the second borehole.

12. The geothermal well according to claim 9, wherein the first portion of the second borehole extends downwardly away from the first borehole at an angle of at least thirty degrees, and wherein the second portion of the second borehole extends downwardly toward the first borehole at an angle of at least thirty degrees.

13. The geothermal well according to claim 9, wherein the fluid is supplied to the fluid pathway down through the casing and up through the second borehole and annulus.

14. The geothermal well according to claim 9, wherein the first portion of the second borehole is drilled to a first location a predetermined distance from a true vertical depth of the geothermal target, wherein the predetermined distance is less than half-way to the true vertical depth of the geothermal target, and wherein the second borehole has a fourth diameter smaller than the first diameter of the first borehole.

15. A method of generating energy, comprising:

drilling a geothermal well comprising:

a first borehole drilled to a geothermal target, the first borehole comprising a first portion and a second portion, wherein the first borehole defines a longitudinal axis, wherein the first portion has a first diameter, wherein the second portion has a second diameter smaller than the first diameter, and wherein the second portion is below the first portion;

a second borehole comprising a first portion and a second portion, wherein a first end portion of the first portion of the second borehole is slide drilled to curve downwardly and outwardly from the first borehole, wherein the first portion of the second borehole extends downwardly and outwardly from the longitudinal axis of the first borehole, wherein the first portion of the second borehole is in fluid communication with the first borehole, wherein a second end portion of the first portion of the second borehole is slide drilled to define a curve, wherein the second end portion of the first portion extends downwardly, wherein a first end portion of the second portion of the second borehole is slide drilled to extend downwardly and towards the longitudinal axis of the first borehole, wherein the second end portion of the first portion of the second borehole and the first end portion of the second portion of the second borehole together form a curved portion of the second borehole, wherein the second end portion of the second borehole is slide drilled to curve downwardly and towards the first borehole, and wherein the second portion of the second borehole is in fluid communication with the first borehole;

a casing positioned in at least a portion of the first borehole, wherein the casing is located below the first end portion of the first portion of the second borehole, wherein the casing has a third diameter smaller than the second diameter, wherein the casing forms an annulus between the casing and the first borehole such that the casing defines a fluid pathway between the casing, the second borehole, and the annulus, and wherein the fluid pathway allows flow of a fluid through the casing in a direction opposite to the flow of the fluid through the second borehole and the annulus;

pumping fluid through the fluid pathway such that the fluid travels down through the casing and up through the second borehole and the annulus, wherein the fluid is heated as the fluid travels along at least a portion of the fluid pathway; and generating energy using a generator adapted to receive the heated fluid exiting the annulus.

16. The method of generating energy according to claim 15, wherein the geothermal well further comprises a plurality of second boreholes, each having a first portion including a first end portion and a second end portion and a second portion including a first end portion and a second end portion, wherein each of the first end portions of the first portions of the plurality of second boreholes are connected to the first borehole at a first point, and each of the second end portions of the second portions of the plurality of second boreholes are connected to the first borehole at a second point, wherein each first point is higher than each corresponding second point for each of the plurality of second boreholes, and wherein the plurality of second boreholes are positioned around the longitudinal axis of the first borehole and radially spaced apart from one another by at least thirty degrees.

17. The method of generating energy according to claim 16, wherein pumping fluid through the fluid pathway further comprises pumping fluid through the fluid pathway such that the fluid travels down through the casing and up through one or more of the plurality second boreholes and the annulus.

18. The method of generating energy according to claim 15, wherein the geothermal well further comprises one or more second casings positioned in one or more of the first end portion of the first portion of the second borehole, the second end portion of the first portion of the second borehole, the first end portion of the second portion of the second borehole, and the second end portion of the second portion of the second borehole.

19. The method of generating energy according to claim 15, wherein the first portion of the second borehole extends downwardly away from the first borehole at an angle of at least thirty degrees, and wherein the second portion of the second borehole extends downwardly towards the first borehole at an angle of at least thirty degrees.

20. The method of generating energy according to claim 15, wherein the second end portion of the first portion of the second borehole is at a first location a predetermined distance from a true vertical depth of the geothermal target, wherein the predetermined distance is less than half-way to the true vertical depth of the geothermal target, and wherein the second borehole has a fourth diameter smaller than the first diameter of the first borehole.

* * * * *